(12) United States Patent
Nakamura et al.

(10) Patent No.: US 12,041,391 B2
(45) Date of Patent: Jul. 16, 2024

(54) DISPLAY DEVICE AND CONTROL METHOD FOR DISPLAY DEVICE

(71) Applicant: SEIKO EPSON CORPORATION, Tokyo (JP)

(72) Inventors: Yasuhiro Nakamura, Matsumoto (JP); Yoshiteru Uchiyama, Suwa (JP); Takumi Takahashi, Matsumoto (JP); Akihiro Kashiwagi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/173,852

(22) Filed: Feb. 24, 2023

(65) Prior Publication Data

US 2023/0269351 A1 Aug. 24, 2023

(30) Foreign Application Priority Data

Feb. 24, 2022 (JP) ................................ 2022-026444

(51) Int. Cl.
*H04N 9/31* (2006.01)
(52) U.S. Cl.
CPC ................ *H04N 9/3155* (2013.01)
(58) Field of Classification Search
None
See application file for complete search history.

(56) References Cited

U.S. PATENT DOCUMENTS

2009/0243993 A1  10/2009  Kuga
2013/0100096 A1*  4/2013  Webster ............... G09G 3/3466
                                                345/207

FOREIGN PATENT DOCUMENTS

JP         2000208281 A     7/2000
JP         2005121997 A     5/2005
WO     WO2008050402 A     5/2008

* cited by examiner

*Primary Examiner* — Ifedayo B Iluyomade
(74) *Attorney, Agent, or Firm* — Dority & Manning, P.A.

(57) ABSTRACT

A control method for a display device includes: determining whether an illuminance in an environment where a display device having a light source is installed belongs to a first range or a second range; when the illuminance in the environment belongs to the first range, adjusting a luminance of the light source by referring to first luminance information designating the luminance corresponding to when the illuminance in the environment belongs to the first range; when the illuminance in the environment belongs to the second range, adjusting the luminance by referring to second luminance information designating the luminance corresponding to when the illuminance in the environment belongs to the second range; when a first operation of changing the luminance when the illuminance belongs to the first range is accepted from a user, updating the first luminance information to an updated first luminance information in response to the first operation; updating the second luminance information, based on the updated first luminance information; when a second operation of changing the luminance when the illuminance belongs to the second range is accepted from the user, updating the second luminance information to an updated second luminance information in response to the second operation; and updating the first luminance information, based on the updated second luminance information.

7 Claims, 6 Drawing Sheets

FIG. 4

| TIME | EVENT | LUMINANCE CORRESPONDING TO ILLUMINANCE (%) | | |
|---|---|---|---|---|
| | | FIRST RANGE | SECOND RANGE | THIRD RANGE |
| T01 | INITIAL STATE | 35 | 55 | 75 |
| T02 | ROOM BECOMES DARKER | 35 | 55 | 75 |
| T03 | MANUALLY CHANGE LUMINANCE TO 40% | 40 | 60 | 80 |
| T04 | ROOM BECOMES SLIGHTLY LIGHTER | 40 | 60 | 80 |
| T05 | MANUALLY CHANGE LUMINANCE TO 100% | 80 | 100 | 100 |
| T06 | ROOM BECOMES DARKER | 80 | 100 | 100 |
| T07 | MANUALLY CHANGE LUMINANCE TO 100% | 100 | 100 | 100 |
| T08 | ROOM BECOMES LIGHTER | 100 | 100 | 100 |
| T09 | MANUALLY CHANGE LUMINANCE TO 75% | 35 | 55 | 75 |
| T10 | ROOM BECOMES DARKER | 35 | 55 | 75 |
| T11 | MANUALLY CHANGE TO 60% DURING LUMINANCE CHANGE | 60 | 80 | 100 |
| T12 | ROOM BECOMES LIGHTER | 60 | 80 | 100 |
| T13 | ROOM BECOMES SLIGHTLY DARKER DURING LUMINANCE CHANGE | 60 | 80 | 100 |

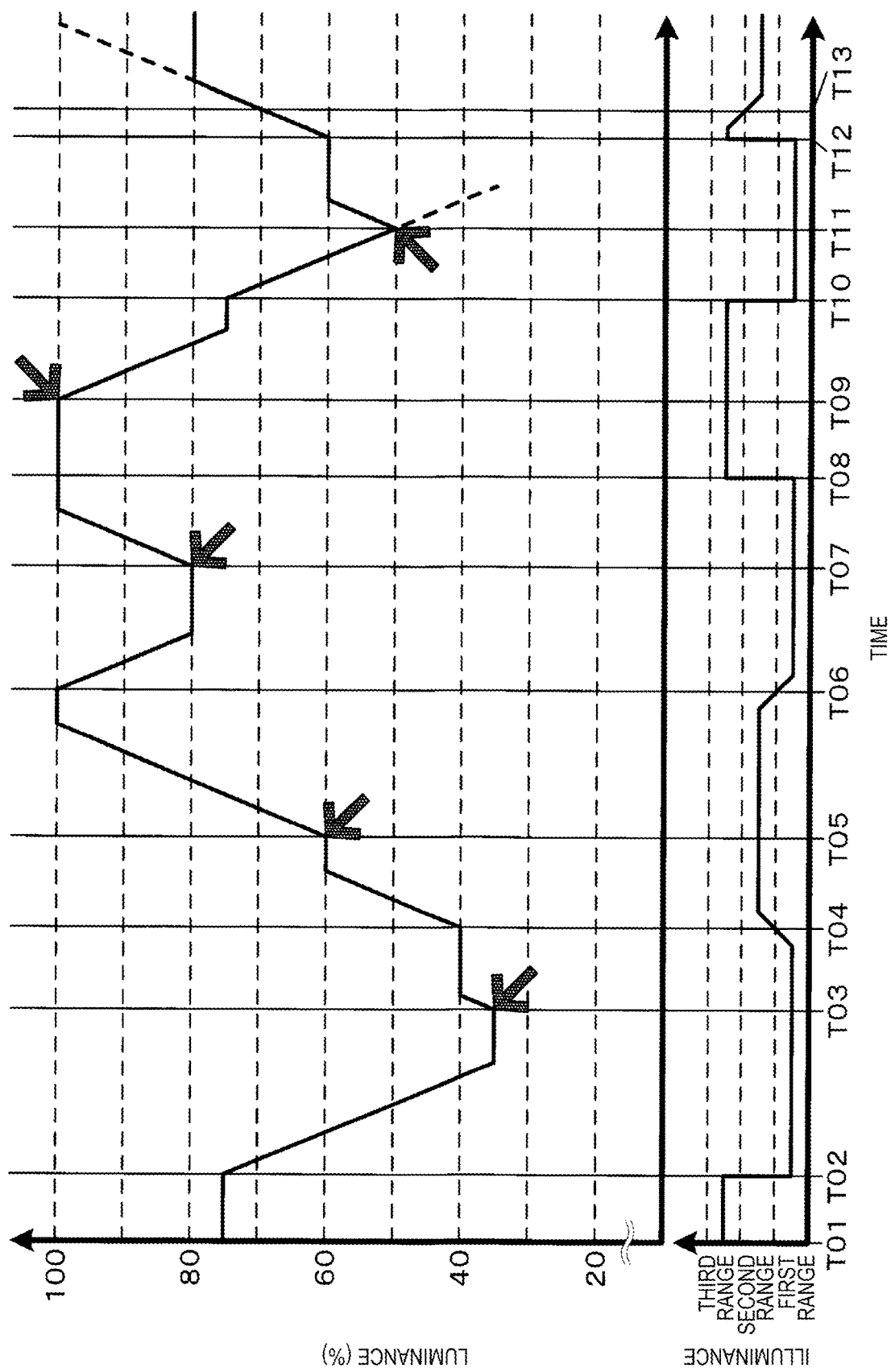

DISPLAY DEVICE AND CONTROL METHOD FOR DISPLAY DEVICE

The present application is based on, and claims priority from JP Application Serial Number 2022-026444, filed Feb. 24, 2022, the disclosure of which is hereby incorporated by reference herein in its entirety.

BACKGROUND

1. Technical Field

The present disclosure relates to a display device and a control method for a display device.

2. Related Art

A display device having a function of adjusting the luminance of a light source when displaying an image has been developed. For example, JP-A-2005-121997 discloses a liquid crystal display device adjusting the luminance of a backlight, which is a light source, based on the illuminance of external light acquired by a light sensor. This liquid crystal display device acquires the illuminance every predetermined time and adjusts the luminance of the backlight in stages according to the illuminance. Therefore, for example, when the illuminance in the environment where the liquid crystal display device is installed is temporarily changed or when the amount of change in the illuminance is small, the liquid crystal display device does not adjust the luminance of the backlight.

By the way, even when the luminance of the light source is automatically adjusted, a user may find a displayed image dark or bright. In such cases, the user may manually change the luminance of the light source. However, JP-A-2005-121997 includes no disclosure about the case of manually changing the luminance of the light source. Therefore, when the user manually changes the luminance of the light source in relation to the illuminance in a certain environment and subsequently the illuminance in the environment changes, how the luminance of the light source is automatically adjusted is unknown.

SUMMARY

According to an aspect of the present disclosure, a control method for a display device having a light source is provided. The control method includes: determining whether an illuminance in an environment where the display device is installed belongs to a first range or a second range; when the illuminance belongs to the first range, referring to first luminance information designating a luminance of the light source corresponding to when the illuminance belongs to the first range, and thus adjusting the luminance of the light source; when the illuminance belongs to the second range, referring to second luminance information designating the luminance of the light source corresponding to when the illuminance belongs to the second range, and thus adjusting the luminance of the light source; when a first operation of changing the luminance of the light source in a state where the illuminance belongs to the first range is accepted from a user, updating the first luminance information in response to the first operation; updating the second luminance information, based on the first luminance information updated in response to the first operation; when a second operation of changing the luminance of the light source in a state where the illuminance belongs to the second range is accepted from the user, updating the second luminance information in response to the second operation; and updating the first luminance information, based on the second luminance information updated in response to the second operation.

According to another aspect of the present disclosure, a display device includes a light source and one or a plurality of processing devices. The processing device executes: determining whether an illuminance in an environment where the display device is installed belongs to a first range or a second range; when the illuminance belongs to the first range, referring to first luminance information designating a luminance of the light source corresponding to when the illuminance belongs to the first range, and thus adjusting the luminance of the light source; when the illuminance belongs to the second range, referring to second luminance information designating the luminance of the light source corresponding to when the illuminance belongs to the second range, and thus adjusting the luminance of the light source; when a first operation of changing the luminance of the light source in a state where the illuminance belongs to the first range is accepted from a user, updating the first luminance information in response to the first operation; updating the second luminance information, based on the first luminance information updated in response to the first operation; when a second operation of changing the luminance of the light source in a state where the illuminance belongs to the second range is accepted from the user, updating the second luminance information in response to the second operation; and updating the first luminance information, based on the second luminance information updated in response to the second operation.

BRIEF DESCRIPTION OF THE DRAWINGS

FIG. 4 is an explanatory view showing the correspondence between an event occurring at times 101 to T13 in a room R1 and a target value of the luminance of a light source 180 set according to the illuminance at the times 101 to T13 in the room R1.

FIG. 5 is a graph for explaining how the illuminance in the room R1 and the luminance of the light source 180 change with the lapse of time.

DESCRIPTION OF EXEMPLARY EMBODIMENTS

Figure 1:
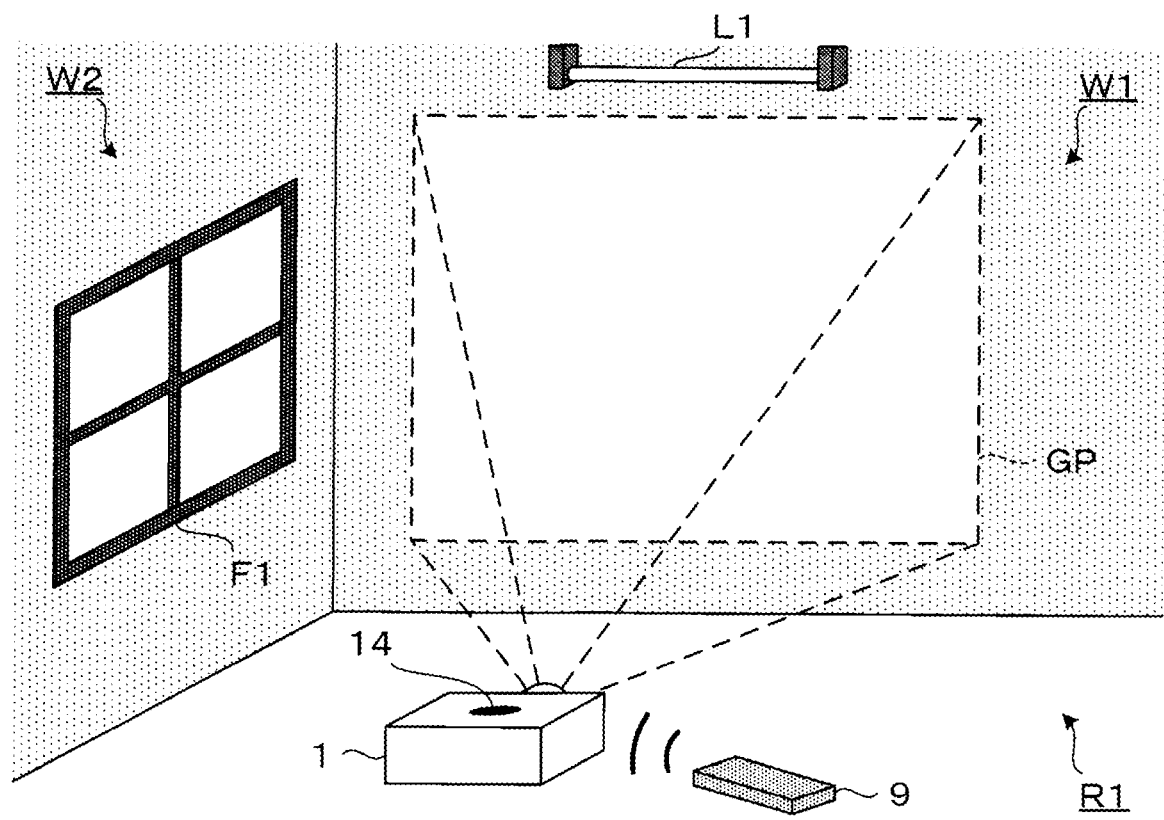
FIG. 1 is a schematic view for explaining an outline of a projector 1 according to a first embodiment.

A preferred embodiment of the present disclosure will now be described with reference to the accompanying drawings. In the drawings, the dimension and scale of each part may differ from the actual dimension and scale and some parts are schematically shown in order to facilitate understanding. The scope of the present disclosure is not limited to the embodiment unless the description below includes any particular description to the effect that the present disclosure should be limited. In the present specification and claims, a numerical range expressed as "Φ to Ψ", where Φ and Ψ are both numerical values, includes the numerical values of the upper limit (Ψ) and the lower limit (Φ). The same unit is used for the upper limit (Ψ) and the lower limit (Φ).

1. First Embodiment

In a first embodiment, the display device and the control method for the display device according to the present disclosure will be described, using an example of a projector that has a function of adjusting the luminance of a light source, based on illuminance information corresponding to the illuminance in an installation environment, and a function of collectively updating luminance information designating the luminance of the light source in response to an operation of changing the luminance of the light source, when this operation is accepted from a user.

1.1. Outline of Projector

FIG. 1 is a schematic view for explaining an outline of a projector 1 according to the first embodiment. In this embodiment, the projector 1 has a sensor 14. It is assumed that the projector 1 installed in a room R1 projects projection light for displaying a projection image GP onto a wall surface W1. The projection image GP is a generic term for an image displayed by the projector 1 projecting projection light onto a display surface. The room R1 has the wall surface W1, a wall surface W2, and an illuminator L1. The wall surface W2 has a window F1. In the room R1, how the projection image GP looks may change, depending on the intensity and direction of light entering from the window F1 and the intensity or the like of light emitted from the illuminator L1. The projector 1 acquires, from the sensor 14, illuminance information corresponding to the illuminance in the room R1, where the projector 1 is installed. The projector 1 controls a light source provided in the projector 1, based on the illuminance information, and thus adjusts the projection image GP in such a way that the projection image GP is displayed with proper luminance.

When a user determines, for example, that the luminance of the projection image GP is not in a proper state, the user can manually change the luminance of the light source of the projector 1, using a controller 9. The controller 9 outputs, for example, an infrared signal for instructing the projector 1 to change the luminance of the light source, in response to an operation from the user.

When the projector 1 has accepted an operation of changing the luminance of the light source from the user, the projector 1 updates one piece of luminance information corresponding to illuminance information corresponding to the illuminance in the room R1 as of when the operation is accepted, of a plurality of pieces of luminance information designating the luminance of the light source. The projector 1 then adjusts the luminance of the light source of the projector 1, referring to the one piece of luminance information that is updated. The projector 1 also updates the other piece of luminance information of the plurality of pieces of luminance information, based on the one piece of luminance information that is updated. That is, when the projector 1 has accepted an operation of changing the luminance of the light source from the user, the projector 1 collectively updates a plurality of pieces of luminance information designating the luminance of the light source, in response to the operation.

1.2. Configuration and Functions of Projector

The configuration and functions of the projector 1 according to the first embodiment will now be described with reference to FIGS. 2 and 3.

Figure 2:
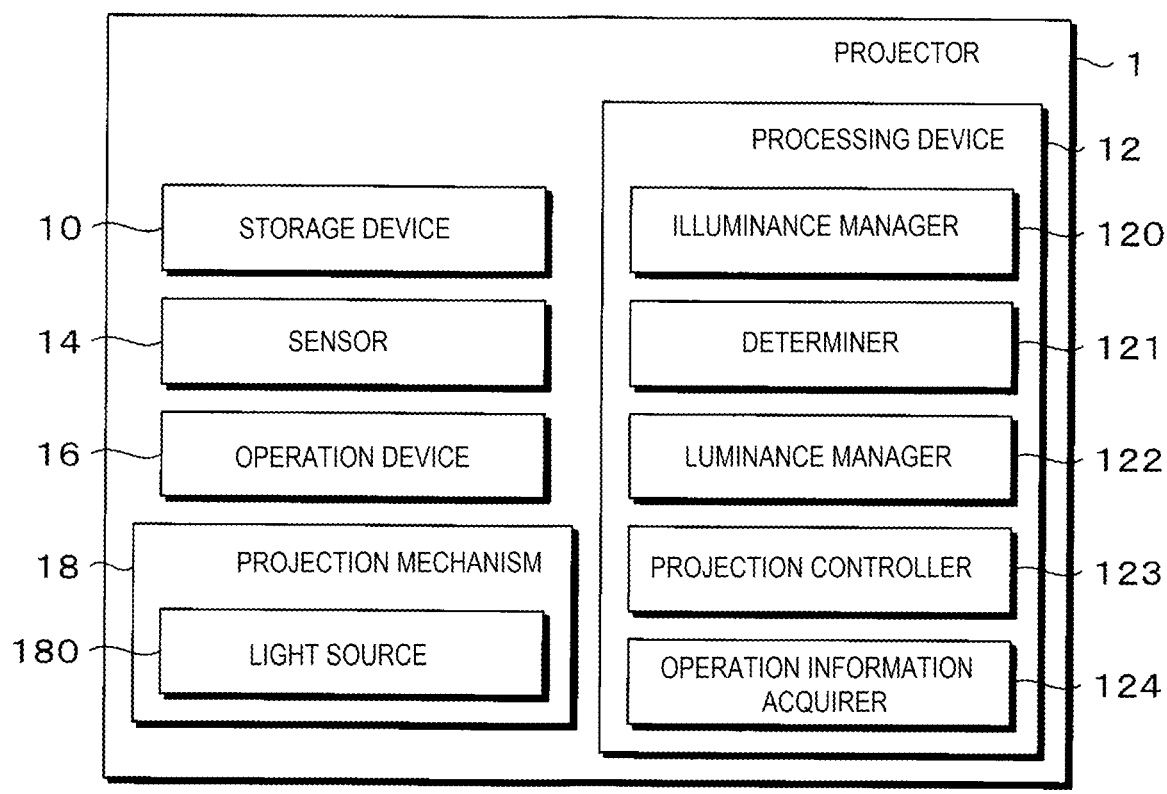
FIG. 2 is a block diagram showing the configuration of the projector 1 according to the first embodiment.

FIG. 2 is a block diagram showing the configuration of the projector 1 according to the first embodiment. The projector 1 has a storage device 10 storing various kinds of information, a processing device 12 controlling the operation of the projector 1, the sensor 14 generating illuminance information corresponding to the illuminance in the environment where the projector 1 is installed, an operation device 16 accepting an input operation from the user of the projector 1, and a projection mechanism 18 projecting projection light and thus displaying an image on a display surface. The processing device 12 has functions as an illuminance manager 120, a determiner 121, a luminance manager 122, a projection controller 123, and an operation information acquirer 124. The projection mechanism 18 has a light source 180.

The storage device 10 includes, for example, a volatile memory such as a RAM, and a non-volatile memory such as a ROM. RAM is an abbreviation for random access memory. ROM is an abbreviation for read-only memory.

Figure 3:
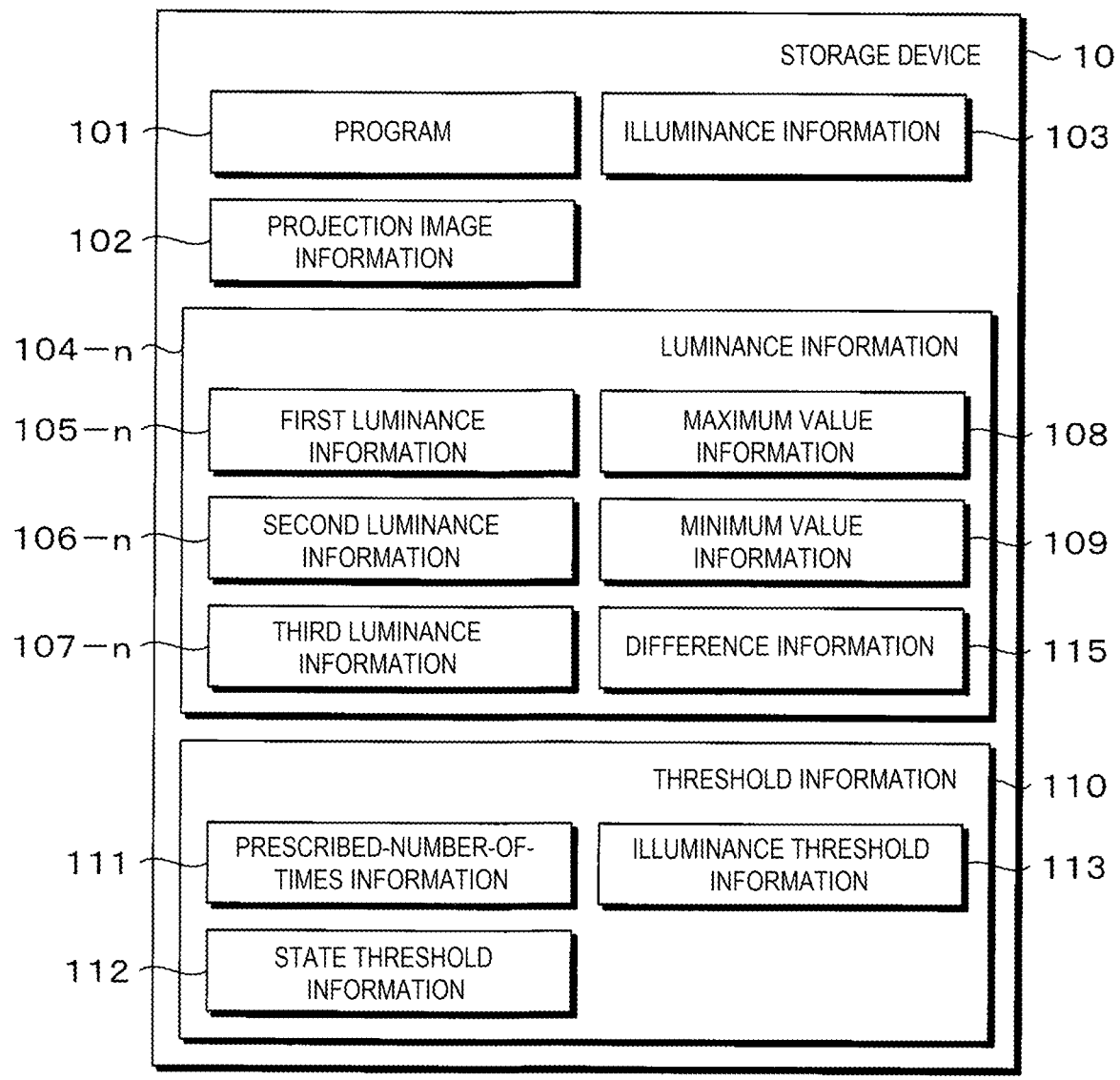
FIG. 3 is a block diagram showing the configuration of a storage device 10 according to the first embodiment.

FIG. 3 is a block diagram showing the configuration of the storage device 10 according to the first embodiment. The non-volatile memory provided in the storage device 10 stores a program 101 prescribing the operation of the projector 1, projection image information 102 representing the projection image GP, illuminance information 103 about the illuminance in the environment where the projector 1 is installed, luminance information 104-$n$ designating the luminance of the light source 180, and threshold information 110 referred to when various determinations are made. In this embodiment, the threshold information 110 includes prescribed-number-of-times information 111, state threshold information 112, and illuminance threshold information 113. The luminance information 104-$n$ includes first luminance information 105-$n$, second luminance information 106-$n$, third luminance information 107-$n$, maximum value information 108, minimum value information 109, and difference information 115. The maximum value information 108 is information representing a maximum value that can be set as the luminance of the light source 180. The minimum value information 109 is information representing a minimum value that can be set as the luminance of the light source 180. The prescribed-number-of-times information 111, the state threshold information 112, and the illuminance threshold information 113, and the first luminance information 105-$n$, the second luminance information 106-$n$, the third luminance information 107-$n$, and the difference information 115 will be described later.

The volatile memory provided in the storage device 10 is used as a work area by the processing device 12 for executing the program 101.

A part or the entirety of the storage device 10 may be provided in an external storage device or an external server or the like. Also, a part or all of the various kinds of information stored in the storage device 10 may be stored in the storage device 10 in advance or may be acquired from an external storage device or an external server or the like.

The processing device 12 includes one or a plurality of CPUs. However, the processing device 12 may have a programmable logic device such as an FPGA instead of the CPU or in addition to the CPU. CPU is an abbreviation for central processing unit. FPGA is an abbreviation for field-programmable gate array.

As the CPU or the like provided in the processing device 12 executes the program 101 and operates according to the program 101, the processing device 12 functions as the illuminance manager 120, the determiner 121, the luminance manager 122, the projection controller 123, and the operation information acquirer 124 shown in FIG. 2.

The sensor 14 includes a light-receiving element that converts incident light into an electrical signal. The sensor 14 generates the illuminance information 103 according to the illuminance in the environment where the projector 1 is installed. That is, in this embodiment, the illuminance information 103 generated by the sensor 14 is information representing a numerical value corresponding to the illuminance in the installation environment of the projector 1 as of when the illuminance information 103 is generated.

The operation device 16 accepts an input operation to the projector 1 from the user of the projector 1. The operation device 16 includes, for example, a touch panel or an operation button or the like provided at the casing of the projector 1, and a light receiver for receiving an infrared signal outputted from the controller 9. When the operation device 16 includes a touch panel, the operation device 16 outputs data representing a detected touch position to the processing device 12. When the operation device 16 includes an operation button, the operation device 16 outputs data identifying a pressed button to the processing device 12. The operation device 16 also receives an infrared signal outputted from the controller 9, decodes this infrared signal, and outputs data representing the content of an operation to the projector 1 from the user, to the processing device 12. Thus, the content of the input operation to the projector 1 is communicated to the processing device 12.

In this embodiment, a series of data outputted to the processing device 12 when the operation device 16 accepts an operation of changing the luminance of the light source 180 from the user may be referred to as "operation information JO". The operation information JO is information for instructing the processing device 12 to change the luminance of the light source 180 and includes information designating the luminance of the light source 180 after the change.

The projection mechanism 18 includes the light source 180, a light modulator, not illustrated, that forms projection light, and a projection system, not illustrated, that projects the projection light onto the display surface. The light source 180 includes, for example, a halogen lamp, a xenon lamp, an ultra-high-pressure mercury lamp, an LED, or a laser light source or the like. The light modulator includes, for example, a DMD or a liquid crystal panel or the like. The projection system includes a projection lens group having a plurality of lenses. LED is an abbreviation for light-emitting diode. DMD is an abbreviation for digital mirror device. The projection mechanism 18, under the control of the projection controller 123, projects projection light for displaying the projection image GP onto the display surface. In this embodiment, the projection mechanism 18 projects the projection light for displaying the projection image GP onto the wall surface W1.

The light source 180 provided in the projection mechanism 18 emits light for forming projection light. The light emitted from the light source 180 is modulated into projection light by the light modulator. The projection mechanism 18 adjusts the luminance of the light source 180 under the control of the projection controller 123.

The functions of the processing device 12 in the case of adjusting the luminance of the light source 180, based on the illuminance information 103, will now be described.

The illuminance manager 120 acquires, from the sensor 14, the illuminance information 103 corresponding to the illuminance in the environment where the projector 1 is installed. The illuminance manager 120 causes the storage device 10 to store the acquired illuminance information 103. The illuminance manager 120 also controls the storage device 10 and thus deletes the illuminance information 103 stored in the storage device 10. In this embodiment, the illuminance information 103 is information about the illuminance in the room R1, where the projector 1 is installed. In this embodiment, the illuminance manager 120 repeatedly acquires the illuminance information 103. That is, a plurality of pieces of the illuminance information 103 are stored in the storage device 10.

The determiner 121 determines whether the number of times the illuminance information 103 is acquired is equal to or greater than a prescribed number of times or not, referring to the illuminance information 103 and the prescribed-number-of-times information 111. In this embodiment, the prescribed-number-of-times information 111 is information representing a numerical value that serves as a threshold for determining whether the number of times the illuminance information 103 is acquired is equal to or greater than the prescribed number of times or not. In this embodiment, the numerical value represented by the prescribed-number-of-times information 111 is a natural number equal to or greater than 2.

The determiner 121 determines whether the difference between a maximum illuminance of the illuminances based on the plurality of pieces of the illuminance information 103 and a minimum illuminance of the illuminances based on the plurality of pieces of the illuminance information 103 is equal to or smaller than a predetermined value or not, referring to the plurality of pieces of the illuminance information 103 and the state threshold information 112. In this embodiment, the state threshold information 112 is information representing a numerical value that serves as a threshold for determining whether the difference between the maximum illuminance of the illuminances based on the plurality of pieces of the illuminance information 103 and the minimum illuminance of the illuminances based on the plurality of pieces of the illuminance information 103 is equal to or smaller than the predetermined value or not.

In this embodiment, when the difference between the maximum illuminance of the illuminances based on the plurality of pieces of the illuminance information 103 and the minimum illuminance of the illuminances based on the plurality of pieces of the illuminance information 103 is equal to or smaller than the predetermined value, it may be described as that "the illuminance in the environment where the projector 1 is installed is in a stable state". That is, to determine whether the difference between the maximum illuminance of the illuminances based on the plurality of pieces of the illuminance information 103 and the minimum illuminance of the illuminances based on the plurality of pieces of the illuminance information 103 is equal to or smaller than the predetermined value or not is to determine whether the illuminance in the environment where the projector 1 is installed is in the stable state or not. When the illuminance in the environment where the projector 1 is installed is not in the stable state, it may be described as that "the illuminance in the environment where the projector 1 is installed is in a transition state".

The determiner 121 determines whether the illuminance in the environment where the projector 1 is installed belongs to a first range, a second range, or a third range, referring to the plurality of pieces of the illuminance information 103 and the illuminance threshold information 113. The illuminance threshold information 113 is information representing two or more numerical values that serve as thresholds for determining whether the illuminance in the environment where the projector 1 is installed belongs to the first range, the second range, or the third range.

In this embodiment, when the illuminance in the environment where the projector 1 is installed belongs to the second range, it is assumed that the illuminance is higher than when belonging to the first range. When the illuminance in the environment where the projector 1 is installed belongs to the third range, it is assumed that the illuminance is higher than when belonging to the second range. That is, the upper limit value of the first range is lower than the lower limit value of the second range. The upper limit value of the second range is lower than the lower limit value of the third range.

In this embodiment, when determining whether the illuminance in the environment where the projector 1 is installed belongs to the first range, the second range, or the third range, the average value of the illuminances based on the plurality of pieces of the illuminance information 103 is used as the illuminance in the environment where the projector 1 is installed.

The luminance manager 122 sets a target value of the luminance of the light source 180 according to the illuminance in the environment where the projector 1 is installed. Specifically, when the illuminance in the environment where the projector 1 is installed belongs to the first range, the luminance manager 122 sets the luminance designated by the first luminance information 105-$n$ as the target value of the luminance of the light source 180. When the illuminance in the environment where the projector 1 is installed belongs to the second range, the luminance manager 122 sets the luminance designated by the second luminance information 106-$n$ as the target value of the luminance of the light source 180. When the illuminance in the environment where the projector 1 is installed belongs to the third range, the luminance manager 122 sets the luminance designated by the third luminance information 107-$n$ as the target value of the luminance of the light source 180.

In this embodiment, the luminance of the light source 180 designated by the first luminance information 105-$n$ is assumed to be equal to or lower than the luminance of the light source 180 designated by the second luminance information 106-$n$. The luminance of the light source 180 designated by the second luminance information 106-$n$ is assumed to be equal to or lower than the luminance of the light source 180 designated by the third luminance information 107-$n$.

In the description below, there are cases where the luminance of the light source 180 designated by the first luminance information 105-$n$, the luminance of the light source 180 designated by the second luminance information 106-$n$, and the luminance of the light source 180 designated by the third luminance information 107-$n$ are described, using the proportion of these luminances to the luminance (maximum value) of the light source 180 designated by the maximum value information 108.

The projection controller 123 controls the projection mechanism 18 and thus adjusts the luminance of the light source 180 to coincide with the target value. In other words, the projection controller 123 refers to the luminance information 104-$n$ and thus adjusts the luminance of the light source 180. For example, when the luminance designated by the first luminance information 105-$n$ is set as the target value of the luminance of the light source 180, the projection controller 123 refers to the first luminance information 105-$n$ and thus adjusts the luminance of the light source 180.

In this embodiment, the projection controller 123 is assumed to adjust the luminance of the light source 180 in such a way that the amount of change per unit time in the luminance of the light source 180 is constant or substantially constant.

The functions of the processing device 12 in the case of updating the luminance information 104-$n$ designating the luminance of the light source 180 in response to an operation of changing the luminance of the light source 180 from the user will now be described.

When the operation device 16 has accepted an operation of changing the luminance of the light source 180 from the user, the operation information acquirer 124 acquires the operation information JO from the operation device 16.

In this embodiment, when the illuminance in the environment where the projector 1 is installed belongs to the first range and the operation information acquirer 124 acquires operation information JO from the operation device 16, this operation information JO may be referred to as "first operation information JO1". When the illuminance in the environment where the projector 1 is installed belongs to the second range and the operation information acquirer 124 acquires operation information JO from the operation device 16, this operation information JO may be referred to as "second operation information JO2". When the illuminance in the environment where the projector 1 is installed belongs to the third range and the operation information acquirer 124 acquires operation information JO from the operation device 16, this operation information JO may be referred to as "third operation information JO3".

In this embodiment, when the operation device 16 outputs the first operation information JO1 to the processing device 12 in response to an operation of changing the luminance of the light source 180 from the user, this operation may be referred to as a "first operation". When the operation device 16 outputs the second operation information JO2 to the processing device 12 in response to an operation of changing the luminance of the light source 180 from the user, this operation may be referred to as a "second operation". When the operation device 16 outputs the third operation information JO3 to the processing device 12 in response to an operation of changing the luminance of the light source 180 from the user, this operation may be referred to as a "third operation".

The luminance manager 122 updates the luminance information 104-$n$, based on the operation information JO. In other words, the luminance manager 122 updates the luminance information 104-$n$ in response to the operation of changing the luminance of the light source 180 from the user. Specifically, the luminance manager 122 updates the first luminance information 105-$n$, based on the first operation information JO1. In other words, the luminance manager 122 updates the first luminance information 105-$n$ in response to the first operation from the user. The luminance manager 122 also updates the second luminance information 106-$n$, based on the second operation information JO2. In other words, the luminance manager 122 updates the second luminance information 106-$n$ in response to the second operation from the user. The luminance manager 122 also updates the third luminance information 107-$n$, based on the third operation information JO3. In other words, the luminance manager 122 updates the third luminance information 107-$n$ in response to the third operation from the user.

When the first luminance information 105-$n$ is updated in response to the first operation from the user, the luminance manager 122 calculates the luminance of the light source 180 designated by the second luminance information 106-$n$ after the update and the luminance of the light source 180 designated by the third luminance information 107-$n$ after the update, based on the first luminance information 105-$n$ updated in response to the first operation, and the difference information 115. The difference information 115 is information designating the degree of the difference between the luminance of the light source 180 designated by the first luminance information 105-$n$ and the luminance of the light source 180 designated by the second luminance information 106-$n$, the degree of the difference between the luminance of the light source 180 designated by the first luminance information 105-$n$ and the luminance of the light source 180 designated by the third luminance information 107-$n$, and the degree of the difference between the luminance of the light source 180 designated by the second luminance information 106-$n$ and the luminance of the light source 180 designated by the third luminance information 107-$n$. In this embodiment, the difference information 115 designates the difference between the luminance of the light source 180 designated by the first luminance information 105-$n$ and the luminance of the light source 180 designated by the second luminance information 106-$n$ to be 20% of the maximum value, as the degree of the difference between the luminance of the light source 180 designated by the first luminance information 105-$n$ and the luminance of the light source 180 designated by the second luminance information 106-$n$. The difference information 115 also designates the difference between the luminance of the light source 180 designated by the second luminance information 106-$n$ and the luminance of the light source 180 designated by the third luminance information 107-$n$ to be 20% of the maximum value, as the degree of the difference between the luminance of the light source 180 designated by the second luminance information 106-$n$ and the luminance of the light source 180 designated by the third luminance information 107-$n$. The difference information 115 also designates the difference between the luminance of the light source 180 designated by the first luminance information 105-$n$ and the luminance of the light source 180 designated by the third luminance information 107-$n$ to be 40% of the maximum value, as the degree of the difference between the luminance of the light source 180 designated by the first luminance information 105-$n$ and the luminance of the light source 180 designated by the third luminance information 107-$n$.

In this embodiment, the luminance manager 122 calculates the luminance of the light source 180 designated by the second luminance information 106-$n$ after the update in such a way that the difference between the luminance of the light source 180 designated by the first luminance information 105-$n$ updated in response to the first operation and the luminance of the light source 180 designated by the second luminance information 106-$n$ after the update, which is calculated based on the first luminance information 105-$n$ updated in response to the first operation, is constant. The luminance manager 122 also calculates the luminance of the light source 180 designated by the third luminance information 107-$n$ after the update in such a way that the difference between the luminance of the light source 180 designated by the first luminance information 105-$n$ updated in response to the first operation and the luminance of the light source 180 designated by the third luminance information 107-$n$ after the update, which is calculated based on the first luminance information 105-$n$ updated in response to the first operation, is constant.

That is, the difference between the luminance of the light source 180 designated by the first luminance information 105-$n$ updated in response to the first operation and the luminance of the light source 180 designated by the second luminance information 106-$n$ after the update, which is calculated based on the first luminance information 105-$n$ updated in response to the first operation, may coincide with the difference between the luminance of the light source 180 designated by the first luminance information 105-$n$ and the luminance of the light source 180 designated by the second luminance information 106-$n$. Also, the difference between the luminance of the light source 180 designated by the first luminance information 105-$n$ updated in response to the first operation and the luminance of the light source 180 designated by the third luminance information 107-$n$ after the update, which is calculated based on the first luminance information 105-$n$ updated in response to the first operation, may coincide with the difference between the luminance of the light source 180 designated by the first luminance information 105-$n$ and the luminance of the light source 180 designated by the third luminance information 107-$n$.

When the second luminance information 106-$n$ is updated in response to the second operation from the user, the luminance manager 122 calculates the luminance of the light source 180 designated by the first luminance information 105-$n$ after the update and the luminance of the light source 180 designated by the third luminance information 107-$n$ after the update, based on the second luminance information 106-$n$ updated in response to the second operation, and the difference information 115.

In this embodiment, the luminance manager 122 calculates the luminance of the light source 180 designated by the first luminance information 105-$n$ after the update in such a way that the difference between the luminance of the light source 180 designated by the second luminance information 106-$n$ updated in response to the second operation and the luminance of the light source 180 designated by the first luminance information 105-$n$ after the update, which is calculated based on the second luminance information 106-$n$ updated in response to the second operation, is constant. The luminance manager 122 also calculates the luminance of the light source 180 designated by the third luminance information 107-$n$ after the update in such a way that the difference between the luminance of the light source 180 designated by the second luminance information 106-$n$ updated in response to the second operation and the luminance of the light source 180 designated by the third luminance information 107-$n$ after the update, which is calculated based on the second luminance information 106-$n$ updated in response to the second operation, is constant.

That is, the difference between the luminance of the light source 180 designated by the second luminance information 106-$n$ updated in response to the second operation and the luminance of the light source 180 designated by the first luminance information 105-$n$ after the update, which is calculated based on the second luminance information 106-$n$ updated in response to the second operation, may coincide with the difference between the luminance of the light source 180 designated by the second luminance information 106-$n$ and the luminance of the light source 180 designated by the first luminance information 105-$n$. Also, the difference between the luminance of the light source 180 designated by the second luminance information 106-$n$ updated in response to the second operation and the luminance of the light source 180 designated by the third luminance information 107-n after the update, which is calculated based on the second luminance information 106-n updated in response to the second operation, may coincide with the difference between the luminance of the light source 180 designated by the second luminance information 106-n and the luminance of the light source 180 designated by the third luminance information 107-n.

When the third luminance information 107-n is updated in response to the third operation from the user, the luminance manager 122 calculates the luminance of the light source 180 designated by the first luminance information 105-n after the update and the luminance of the light source 180 designated by the second luminance information 106-n after the update, based on the third luminance information 107-n updated in response to the third operation, and the difference information 115.

In this embodiment, the luminance manager 122 calculates the luminance of the light source 180 designated by the first luminance information 105-n after the update in such a way that the difference between the luminance of the light source 180 designated by the third luminance information 107-n updated in response to the third operation and the luminance of the light source 180 designated by the first luminance information 105-n after the update, which is calculated based on the third luminance information 107-n updated in response to the third operation, is constant. The luminance manager 122 also calculates the luminance of the light source 180 designated by the second luminance information 106-n after the update in such a way that the difference between the luminance of the light source 180 designated by the third luminance information 107-n updated in response to the third operation and the luminance of the light source 180 designated by the second luminance information 106-n after the update, which is calculated based on the third luminance information 107-n updated in response to the third operation, is constant.

That is, the difference between the luminance of the light source 180 designated by the third luminance information 107-n updated in response to the third operation and the luminance of the light source 180 designated by the first luminance information 105-n after the update, which is calculated based on the third luminance information 107-n updated in response to the third operation, may coincide with the difference between the luminance of the light source 180 designated by the third luminance information 107-n and the luminance of the light source 180 designated by the first luminance information 105-n. Also, the difference between the luminance of the light source 180 designated by the third luminance information 107-n updated in response to the third operation and the luminance of the light source 180 designated by the second luminance information 106-n after the update, which is calculated based on the third luminance information 107-n updated in response to the third operation, may coincide with the difference between the luminance of the light source 180 designated by the third luminance information 107-n and the luminance of the light source 180 designated by the second luminance information 106-n.

The determiner 121 refers to the maximum value information 108 and determines whether the calculated luminances of the light source 180 designated by the luminance information 104-n after the update include a luminance higher than the luminance of the light source 180 designated by the maximum value information 108 or not.

When the calculated luminances of the light source 180 designated by the luminance information 104-n after the update include a luminance higher than the luminance of the light source 180 designated by the maximum value information 108, the luminance manager 122 changes the luminance higher than the luminance of the light source 180 designated by the maximum value information 108 to the luminance (maximum value) of the light source 180 designated by the maximum value information 108.

The determiner 121 also refers to the minimum value information 109 and determines whether the calculated luminances of the light source 180 designated by the luminance information 104-n after the update include a luminance lower than the luminance of the light source 180 designated by the minimum value information 109 or not.

When the calculated luminances of the light source 180 designated by the luminance information 104-n after the update include a luminance lower than the luminance of the light source 180 designated by the minimum value information 109, the luminance manager 122 changes the luminance lower than the luminance of the light source 180 designated by the minimum value information 109 to the luminance (minimum value) of the light source 180 designated by the minimum value information 109.

The luminance manager 122 updates the luminance information 104-n except the luminance information 104-n updated based on the operation information JO. That is, when the calculated luminance of the light source 180 is not a luminance higher than the luminance of the light source 180 designated by the maximum value information 108 or a luminance lower than the luminance of the light source 180 designated by the minimum value information 109, the luminance manager 122 updates the luminance information 104-n in such a way that the luminance of the light source 180 designated by the luminance information 104-n after the update is the calculated luminance of the light source 180. Meanwhile, when the calculated luminance of the light source 180 is a luminance higher than the luminance of the light source 180 designated by the maximum value information 108, the luminance manager 122 updates the luminance information 104-n in such a way that the luminance of the light source 180 designated by the luminance information 104-n after the update is the luminance (maximum value) of the light source 180 designated by the maximum value information 108. When the calculated luminance of the light source 180 is a luminance lower than the luminance of the light source 180 designated by the minimum value information 109, the luminance manager 122 updates the luminance information 104-n in such a way that the luminance of the light source 180 designated by the luminance information 104-n after the update is the luminance (minimum value) of the light source 180 designated by the minimum value information 109.

1.3. Operation of Projector

A specific example of the operation of the projector 1 according to the first embodiment will now be described with reference to FIGS. 4 and 5.

FIG. 4 is an explanatory view showing the correspondence between an event occurring at times 101 to T13 in the room R1 and a target value of the luminance of the light source 180 set according to the illuminance at the times 101 to T13 in the room R1. In FIG. 4, the target value of the luminance of the light source 180 at each time is expressed by a numerical value with no hatching. FIG. 4 shows the correspondence between the illuminance in the room R1 at each time and the target value of the luminance of the light source 180. For example, FIG. 4 shows that, at the time T01, the illuminance in the room R1 belongs to the third range and the target value of the luminance of the light source 180 is set to be 75% of the maximum value. That is, 75% of the maximum value, which is the luminance designated by the third luminance information 107-n, is set as the target value of the luminance of the light source 180. The numerical values hatched in FIG. 4 express luminances that are not set as the target value of the luminance of the light source 180 at each time. For example, FIG. 4 shows that, at the time T01, when the illuminance in the room R1 belongs to the first range, 35% of the maximum value, which is the luminance designated by the first luminance information 105-n, is set as the target value of the luminance of the light source 180.

In the description below, the luminance information 104-n at the times 101 to T13 may be referred to as luminance information 104-01 to 13. The first luminance information 105-n at the times 101 to T13 may be referred to as first luminance information 105-01 to 13. The second luminance information 106-n at the times T01 to T13 may be referred to as second luminance information 106-01 to 13. The third luminance information 107-n at the times T01 to T13 may be referred to as third luminance information 107-01 to 13. That is, the symbol "n" attached to the luminance information 104-n, the first luminance information 105-n, the second luminance information 106-n, and the third luminance information 107-n corresponds to the symbols "01" to "13" attached to the times T01 to T13, at these times, respectively.

FIG. 5 is a graph for explaining changes in the illuminance in the room R1 and the luminance of the light source 180 with the lapse of time. The graph shown in FIG. 5 illustrates how the illuminance in the room R1 and the luminance of the light source 180 change at the times 101 to T13. In the graph shown in FIG. 5, the amount of change per unit time in the luminance of the light source 180 is assumed to be constant.

At the time T01, the illuminance in the room R1 belongs to the third range. The target value of the luminance of the light source 180 is set to be 75% of the maximum value, which is the luminance designated by the third luminance information 107-01. At the time T01, the luminance has already reached 75% of the maximum value, which is the target value. Therefore, the luminance of the light source 180 does not change until the time T02. The luminance of the light source 180 designated by the first luminance information 105-01 is 35% of the maximum value. The luminance of the light source 180 designated by the second luminance information 106-01 is 55% of the maximum value.

At the time T02, the room R1 becomes darker and the illuminance changes from the third range to the first range. The projector 1 sets the target value of the luminance of the light source 180 to be 35% of the maximum value, which is the luminance designated by the first luminance information 105-02. The projector 1 then controls the projection mechanism 18 and thus adjusts the luminance of the light source 180 to reach 35% of the maximum value. At this point, the first luminance information 105-02, the second luminance information 106-02, and the third luminance information 107-02 coincide with the first luminance information 105-01, the second luminance information 106-01, and the third luminance information 107-01, respectively.

After the luminance of the light source 180 reaches 35% of the maximum value, the user manually changes the luminance of the light source 180 to 40% of the maximum value at the time T03. As the illuminance in the room R1 belongs to the first range, the projector 1 updates the first luminance information 105-02 with the first luminance information 105-03 in response to the first operation from the user. The luminance of the light source 180 designated by the first luminance information 105-03 is 40% of the maximum value. The projector 1 also updates the second luminance information 106-02 with the second luminance information 106-03, based on the first luminance information 105-03 and the difference information 115. The luminance of the light source 180 designated by the second luminance information 106-03 is 60% of the maximum value. The projector 1 also updates the third luminance information 107-02 with the third luminance information 107-03, based on the first luminance information 105-03 and the difference information 115. The luminance of the light source 180 designated by the third luminance information 107-03 is 80% of the maximum value. The projector 1 also sets the target value of the luminance of the light source 180 to be 40% of the maximum value, which is the luminance designated by the first luminance information 105-03. The projector 1 controls the projection mechanism 18 and thus adjusts the luminance of the light source 180 to reach 40% of the maximum value.

That is, as a result of updating the second luminance information 106-02 based on the first luminance information 105-03 updated in response to the first operation, the degree of the difference between the luminance of the light source 180 designated by the first luminance information 105-03 updated in response to the first operation and the luminance of the light source 180 designated by the second luminance information 106-03 updated based on the first luminance information 105-03 updated in response to the first operation coincides with the degree of the difference between the luminance of the light source 180 designated by the first luminance information 105-02 and the luminance of the light source 180 designated by the second luminance information 106-02.

After the luminance of the light source 180 reaches 40% of the maximum value, the room R1 becomes slightly lighter and the illuminance changes from the first range to the second range at the time T04. The projector 1 sets the target value of the luminance of the light source 180 to be 60% of the maximum value, which is the luminance designated by the second luminance information 106-04. The projector 1 then controls the projection mechanism 18 and thus adjusts the luminance of the light source 180 to reach 60% of the maximum value. At this point, the first luminance information 105-04, the second luminance information 106-04, and the third luminance information 107-04 coincide with the first luminance information 105-03, the second luminance information 106-03, and the third luminance information 107-03, respectively.

After the luminance of the light source 180 reaches 60% of the maximum value, the user manually changes the luminance of the light source 180 to 100% of the maximum value, that is, the maximum value, at the time T05. As the illuminance in the room R1 belongs to the second range, the projector 1 updates the second luminance information 106-04 with the second luminance information 106-05 in response to the second operation from the user. The luminance of the light source 180 designated by the second luminance information 106-05 is the maximum value. The projector 1 also updates the first luminance information 105-04 with the first luminance information 105-05, based on the second luminance information 106-05 and the difference information 115. The luminance of the light source 180 designated by the first luminance information 105-05 is 80% of the maximum value. The projector 1 also updates the third luminance information 107-04 with the third luminance information 107-05, based on the second luminance information 106-05 and the difference information 115. At this point, as a result of calculating the luminance of the light source 180 designated by the third luminance information 107-05 in such a way that the difference between the luminance of the light source 180 designated by the second luminance information 106-05 and the luminance of the light source 180 designated by the third luminance information 107-05 is constant (specifically 20% of the maximum value), the luminance of the light source 180 becomes 120% of the maximum value. Therefore, the projector 1 executes processing of changing the calculated luminance of the light source 180 from 120% of the maximum value to the maximum value and then updates the third luminance information 107-04 with the third luminance information 107-05. The projector 1 also sets the target value of the luminance of the light source 180 to be the maximum value, which is the luminance designated by the second luminance information 106-05. The projector 1 controls the projection mechanism 18 and thus adjusts the luminance of the light source 180 to reach the maximum value.

That is, as a result of updating the first luminance information 105-04 based on the second luminance information 106-05 updated in response to the second operation, the degree of the difference between the luminance of the light source 180 designated by the second luminance information 106-05 updated in response to the second operation and the luminance of the light source 180 designated by the first luminance information 105-05 updated based on the second luminance information 106-05 updated in response to the second operation coincides with the degree of the difference between the luminance of the light source 180 designated by the first luminance information 105-04 and the luminance of the light source 180 designated by the second luminance information 106-04.

After the luminance of the light source 180 reaches the maximum value, the room R1 becomes darker and the illuminance changes from the second range to the first range at the time T06. The projector 1 sets the target value of the luminance of the light source 180 to be 80% of the maximum value, which is the luminance designated by the first luminance information 105-06. The projector 1 then controls the projection mechanism 18 and thus adjusts the luminance of the light source 180 to reach 80% of the maximum value. At this point, the first luminance information 105-06, the second luminance information 106-06, and the third luminance information 107-06 coincide with the first luminance information 105-05, the second luminance information 106-05, and the third luminance information 107-05, respectively.

After the luminance of the light source 180 reaches 80% of the maximum value, the user manually changes the luminance of the light source 180 to the maximum value at the time T07. As the illuminance in the room R1 belongs to the first range, the projector 1 updates the first luminance information 105-06 with the first luminance information 105-07 in response to the first operation from the user. The luminance of the light source 180 designated by the first luminance information 105-07 is the maximum value. The projector 1 also updates the second luminance information 106-06 with the second luminance information 106-07, based on the first luminance information 105-07 and the difference information 115. At this point, as a result of calculating the luminance of the light source 180 designated by the second luminance information 106-07 in such a way that the difference between the luminance of the light source 180 designated by the first luminance information 105-07 and the luminance of the light source 180 designated by the second luminance information 106-07 is constant (specifically 20% of the maximum value), the luminance of the light source 180 becomes 120% of the maximum value. Therefore, the projector 1 executes processing of changing the calculated luminance of the light source 180 from 120% of the maximum value to the maximum value and then updates the second luminance information 106-06 with the second luminance information 106-07. The projector 1 also updates the third luminance information 107-06 with the third luminance information 107-07, based on the first luminance information 105-07 and the difference information 115. At this point, as a result of calculating the luminance of the light source 180 designated by the third luminance information 107-07 in such a way that the difference between the luminance of the light source 180 designated by the first luminance information 105-07 and the luminance of the light source 180 designated by the third luminance information 107-07 is constant (specifically 40% of the maximum value), the luminance of the light source 180 becomes 140% of the maximum value. Therefore, the projector 1 executes processing of changing the calculated luminance of the light source 180 from 140% of the maximum value to the maximum value and then updates the third luminance information 107-06 with the third luminance information 107-07. The projector 1 also sets the target value of the luminance of the light source 180 to be the maximum value, which is the luminance designated by the first luminance information 105-07. The projector 1 controls the projection mechanism 18 and thus adjusts the luminance of the light source 180 to reach the maximum value.

That is, when the luminance of the light source 180 designated by the second luminance information 106-06 is higher than the maximum value in the update of the second luminance information 106-06 based on the first luminance information 105-07 updated in response to the first operation, the maximum value is set as the luminance of the light source 180 designated by the second luminance information 106-07 updated based on the first luminance information 105-07 updated in response to the first operation.

After the luminance of the light source 180 reaches the maximum value, the room R1 becomes lighter and the illuminance changes from the first range to the third range at the time T08. The projector 1 sets the target value of the luminance of the light source 180 to be the maximum value, which is the luminance designated by the third luminance information 107-08. The projector 1 then controls the projection mechanism 18 and thus adjusts the luminance of the light source 180 to reach the maximum value. At the time T08, the luminance has already reached the maximum value, which is the target value, and therefore the luminance of the light source 180 does not change until the time T09. The first luminance information 105-08, the second luminance information 106-08, and the third luminance information 107-08 coincide with the first luminance information 105-07, the second luminance information 106-07, and the third luminance information 107-07, respectively.

At the time T09, the user manually changes the luminance of the light source 180 to 75% of the maximum value. As the illuminance in the room R1 belongs to the third range, the projector 1 updates the third luminance information 107-08 with the third luminance information 107-09 in response to the third operation from the user. The luminance of the light source 180 designated by the third luminance information 107-09 is 75% of the maximum value. The projector 1 also updates the first luminance information 105-08 with the first luminance information 105-09, based on the third luminance information 107-09 and the difference information 115. The luminance of the light source 180 designated by the first luminance information 105-09 is 35% of the maximum value. The projector 1 also updates the second luminance information 106-08 with the second luminance information 106-09, based on the third luminance information 107-09 and the difference information 115. The luminance of the light source 180 designated by the second luminance information 106-09 is 55% of the maximum value. The projector 1 also sets the target value of the luminance of the light source 180 to be 75% of the maximum value, which is the luminance designated by the third luminance information 107-09. The projector 1 controls the projection mechanism 18 and thus adjusts the luminance of the light source 180 to reach 75% of the maximum value.

After the luminance of the light source 180 reaches 75% of the maximum value, the room R1 becomes darker and the illuminance changes from the third range to the first range at the time T10. The projector 1 sets the target value of the luminance of the light source 180 to be 35% of the maximum value, which is the luminance designated by the first luminance information 105-10. The projector 1 then controls the projection mechanism 18 and thus adjusts the luminance of the light source 180 to reach 35% of the maximum value. At this point, the first luminance information 105-10, the second luminance information 106-10, and the third luminance information 107-10 coincide with the first luminance information 105-09, the second luminance information 106-09, and the third luminance information 107-09, respectively.

Before the luminance of the light source 180 reaches 35% of the maximum value, the user manually changes the luminance of the light source 180 to 60% of the maximum value at the time T11. As the illuminance in the room R1 belongs to the first range, the projector 1 updates the first luminance information 105-10 with the first luminance information 105-11 in response to the first operation from the user. The luminance of the light source 180 designated by the first luminance information 105-11 is 60% of the maximum value. The projector 1 also updates the second luminance information 106-10 with the second luminance information 106-11, based on the first luminance information 105-11 and the difference information 115. The luminance of the light source 180 designated by the second luminance information 106-11 is 80% of the maximum value. The projector 1 also updates the third luminance information 107-10 with the third luminance information 107-11, based on the first luminance information 105-11 and the difference information 115. The luminance of the light source 180 designated by the third luminance information 107-11 is the maximum value. The projector 1 also sets the target value of the luminance of the light source 180 to be 60% of the maximum value, which is the luminance designated by the first luminance information 105-11. The projector 1 controls the projection mechanism 18 and thus adjusts the luminance of the light source 180 to reach 60% of the maximum value. In this case, the luminance of the light source 180 does not reach 35% of the maximum value, which is the target value before the change, and is adjusted to reach 60% of the maximum value, which is the target value after the change.

After the luminance of the light source 180 reaches 60% of the maximum value, the room R1 becomes lighter and the illuminance changes from the first range to the third range at the time T12. The projector 1 sets the target value of the luminance of the light source 180 to be the maximum value, which is the luminance designated by the third luminance information 107-12. The projector 1 then controls the projection mechanism 18 and thus adjusts the luminance of the light source 180 to reach the maximum value. At this point, the first luminance information 105-12, the second luminance information 106-12, and the third luminance information 107-12 coincide with the first luminance information 105-11, the second luminance information 106-11, and the third luminance information 107-11, respectively.

Before the luminance of the light source 180 reaches the maximum value, the room R1 becomes slightly darker and the illuminance changes from the third range to the second range at the time T13. The projector 1 sets the target value of the luminance of the light source 180 to be 80% of the maximum value, which is the luminance designated by the second luminance information 106-13. The projector 1 then controls the projection mechanism 18 and thus adjusts the luminance of the light source 180 to reach 80% of the maximum value. In this case, the luminance of the light source 180 does not reach the maximum value, which is the target value before the change, and is adjusted to reach 80% of the maximum value, which is the target value after the change. The first luminance information 105-13, the second luminance information 106-13, and the third luminance information 107-13 coincide with the first luminance information 105-12, the second luminance information 106-12, and the third luminance information 107-12, respectively.

The operation of the projector 1 according to the first embodiment will now be described in detail with reference to FIGS. 6 and 7.

Figure 6:
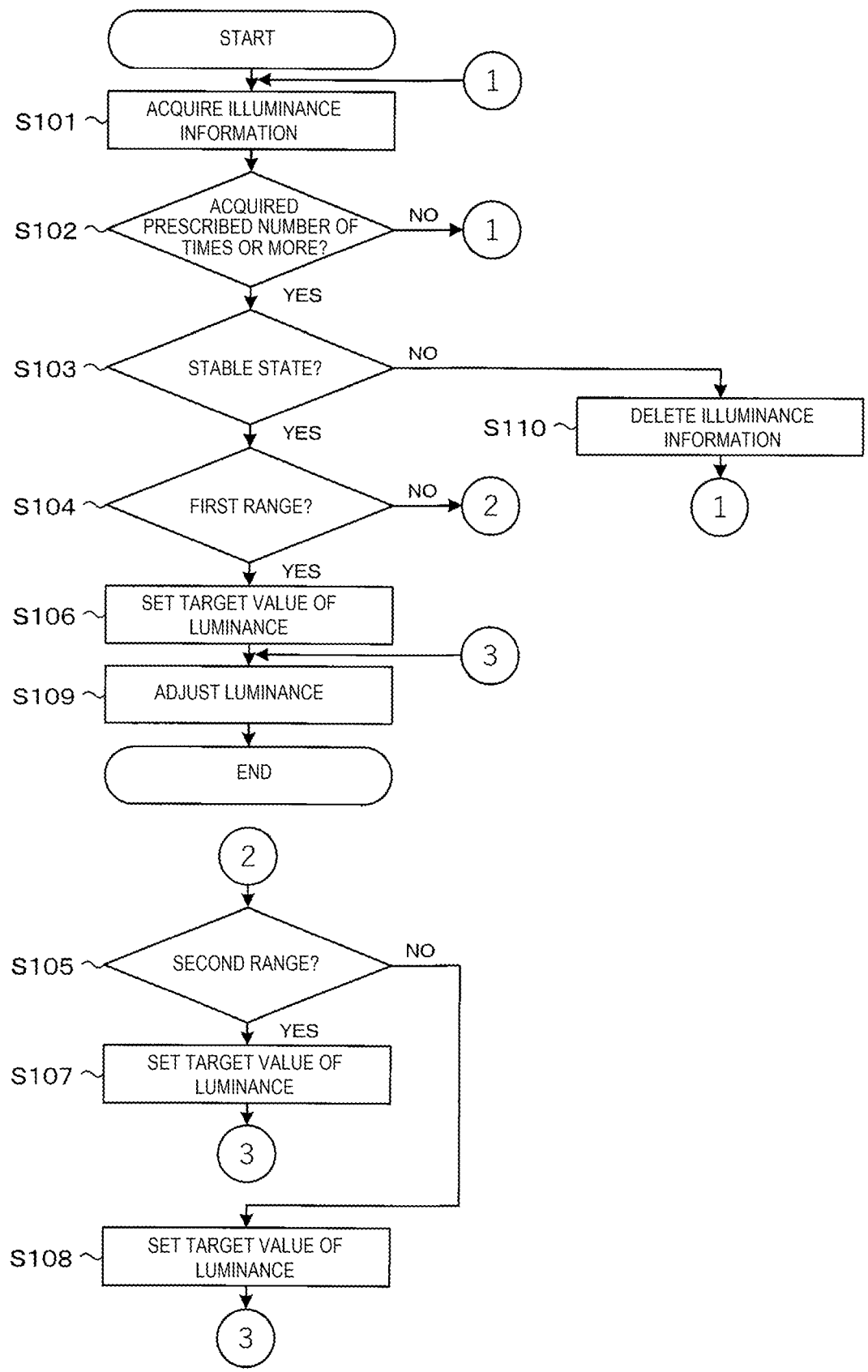
FIG. 6 is a flowchart for explaining an operation of the projector 1 in the case of adjusting the luminance of the light source 180, based on illuminance information 130.

FIG. 6 is a flowchart for explaining the operation of the projector 1 in the case of adjusting the luminance of the light source 180, based on the illuminance information 103. A series of operations shown in this flowchart is started, for example, when the power of the projector 1 is turned on and the operation device 16 accepts an input operation for the start of the operation from the user of the projector 1. The projector 1 executes the series of operations shown in this flowchart, for example, at the time T04 shown in FIGS. 4 and 5. In this embodiment, it is assumed that the projector 1 projects projection light for displaying the projection image GP onto the wall surface W1 in response to the power being turn on. That is, the luminance of the light source 180 is assumed to be equal to or higher than the minimum value before processing in step S101, described later, is executed.

In step S101, the illuminance manager 120 acquires, from the sensor 14, the illuminance information 103 corresponding to the illuminance in the room R1, where the projector 1 is installed. The illuminance manager 120 causes the storage device 10 to store the acquired illuminance information 103.

In step S102, the determiner 121 determines whether the number of times the illuminance information 103 is acquired is equal to or greater than a prescribed number of times or not, referring to the illuminance information 103 and the prescribed-number-of-times information 111. When the number of times the illuminance information 103 is acquires is equal to or greater than the prescribed number of times, that is, when YES in step S102, the determiner 121 advances the processing to step S103. Meanwhile, when the number of times the illuminance information 103 is acquired is less than the prescribed number of times, that is, when NO in step S102, the determiner 121 advances the processing to step S101.

As described above, the numerical value represented by the prescribed-number-of-times information 111 is a natural number equal to or greater than 2. Therefore, in step S102, the determiner 121 determines whether the number of times the illuminance information 103 is acquired is equal to or greater than a predetermined plurality of times or not. When YES in step S102, a plurality of pieces of the illuminance information 103 are stored in the storage device 10. The projector 1 repeatedly executes the processing in steps S101 and S102 until the number of times the illuminance information 103 is acquired becomes equal to or greater than the prescribed number of times.

In step S103, the determiner 121 determines whether the difference between a maximum illuminance of the illuminances based on the plurality of pieces of the illuminance information 103 and a minimum illuminance of the illuminances based on the plurality of pieces of the illuminance information 103 is equal to or smaller than a predetermined value or not, referring to the plurality of pieces of the illuminance information 103, and the state threshold information 112. When the difference between the maximum illuminance of the illuminances based on the plurality of pieces of the illuminance information 103 and the minimum illuminance of the illuminances based on the plurality of pieces of the illuminance information 103 is equal to or smaller than the predetermined value, that is, when YES in step S103, the determiner 121 advances the processing to step S104. Meanwhile, when the difference between the maximum illuminance of the illuminances based on the plurality of pieces of the illuminance information 103 and the minimum illuminance of the illuminances based on the plurality of pieces of the illuminance information 103 is greater than the predetermined value, that is, when NO in step S103, the determiner 121 advances the processing to step S110.

In step S110, the illuminance manager 120 controls the storage device 10 and thus deletes the illuminance information 103 stored in the storage device 10.

In step S103, the determiner 121 determines whether the illuminance in the environment where the projector 1 is installed is in a stable state or in a transition state, based on the plurality of pieces of the illuminance information 103. When the illuminance in the environment is in the transition state, the illuminance value based on the illuminance information 103 varies largely and therefore the illuminance information 103 may not have been acquired accurately. Therefore, when NO in step S103, that is, when the illuminance in the environment where the projector 1 is installed is in the transition state, the projector 1 executes the processing in step S110 and thus deletes a part or all of the illuminance information 103 stored in the storage device 10. The projector 1 then executes the processing in step S101 and thus reacquires the illuminance information 103. The reacquisition of the illuminance information 103 is repeatedly executed until it is determined that the illuminance in the environment where the projector 1 is installed is in the stable state.

In step S104, the determiner 121 determines whether the illuminance in the environment where the projector 1 is installed belongs to the first range or not, referring to the plurality of pieces of the illuminance information 103, and the illuminance threshold information 113. When the illuminance in the environment where the projector 1 is installed belongs to the first range, that is, when YES in step S104, the determiner 121 advances the processing to step S106. Meanwhile, when the illuminance in the environment where the projector 1 is installed does not belong to the first range, that is, when NO in step S104, the determiner 121 advances the processing to step S105.

In step S105, the determiner 121 determines whether the illuminance in the environment where the projector 1 is installed belongs to the second range or not, referring to the plurality of pieces of the illuminance information 103, and the illuminance threshold information 113. When the illuminance in the environment where the projector 1 is installed belongs to the second range, that is, when YES in step S105, the determiner 121 advances the processing to step S107. Meanwhile, when the illuminance in the environment where the projector 1 is installed does not belong to the second range, that is, when NO in step S105, the determiner 121 advances the processing to step S108.

In this embodiment, when the result of the determination is NO in both steps S104 and S105, the illuminance in the environment where the projector 1 is installed belongs to the third range.

In step S106, the luminance manager 122 sets the luminance designated by the first luminance information 105-$n$ as the target value of the luminance of the light source 180.

In step S107, the luminance manager 122 sets the luminance designated by the second luminance information 106-$n$ as the target value of the luminance of the light source 180.

In step S108, the luminance manager 122 sets the luminance designated by the third luminance information 107-$n$ as the target value of the luminance of the light source 180.

In step S109, the projection controller 123 controls the projection mechanism 18 and thus adjusts the luminance of the light source 180 in such a way as to coincide with the target value. In other words, the projection controller 123 refers to the luminance information 104-$n$ and thus adjusts the luminance of the light source 180.

When the illuminance in the environment where the projector 1 is installed belongs to the first range, that is, when the luminance manager 122 sets the luminance designated by the first luminance information 105-$n$ as the target value of the luminance of the light source 180 in step S106, the projection controller 123 in step S109 refers to the first luminance information 105-$n$ and thus adjusts the luminance of the light source 180. When the illuminance in the environment where the projector 1 is installed belongs to the second range, that is, when the luminance manager 122 sets the luminance designated by the second luminance information 106-$n$ as the target value of the luminance of the light source 180 in step S107, the projection controller 123 in step S109 refers to the second luminance information 106-$n$ and thus adjusts the luminance of the light source 180. When the illuminance in the environment where the projector 1 is installed belongs to the third range, that is, when the luminance manager 122 sets the luminance designated by the third luminance information 107-$n$ as the target value of the luminance of the light source 180 in step S108, the projection controller 123 in step S109 refers to the third luminance information 107-$n$ and thus adjusts the luminance of the light source 180.

After the operation in step S109 is executed, the processing device 12 ends the series of operations shown in the flowchart of FIG. 6.

In this way, the projector 1 executes the series of operations shown in the flowchart of FIG. 6 and thus can adjust the luminance of the light source 180, based on the illuminance information 103.

Figure 7:
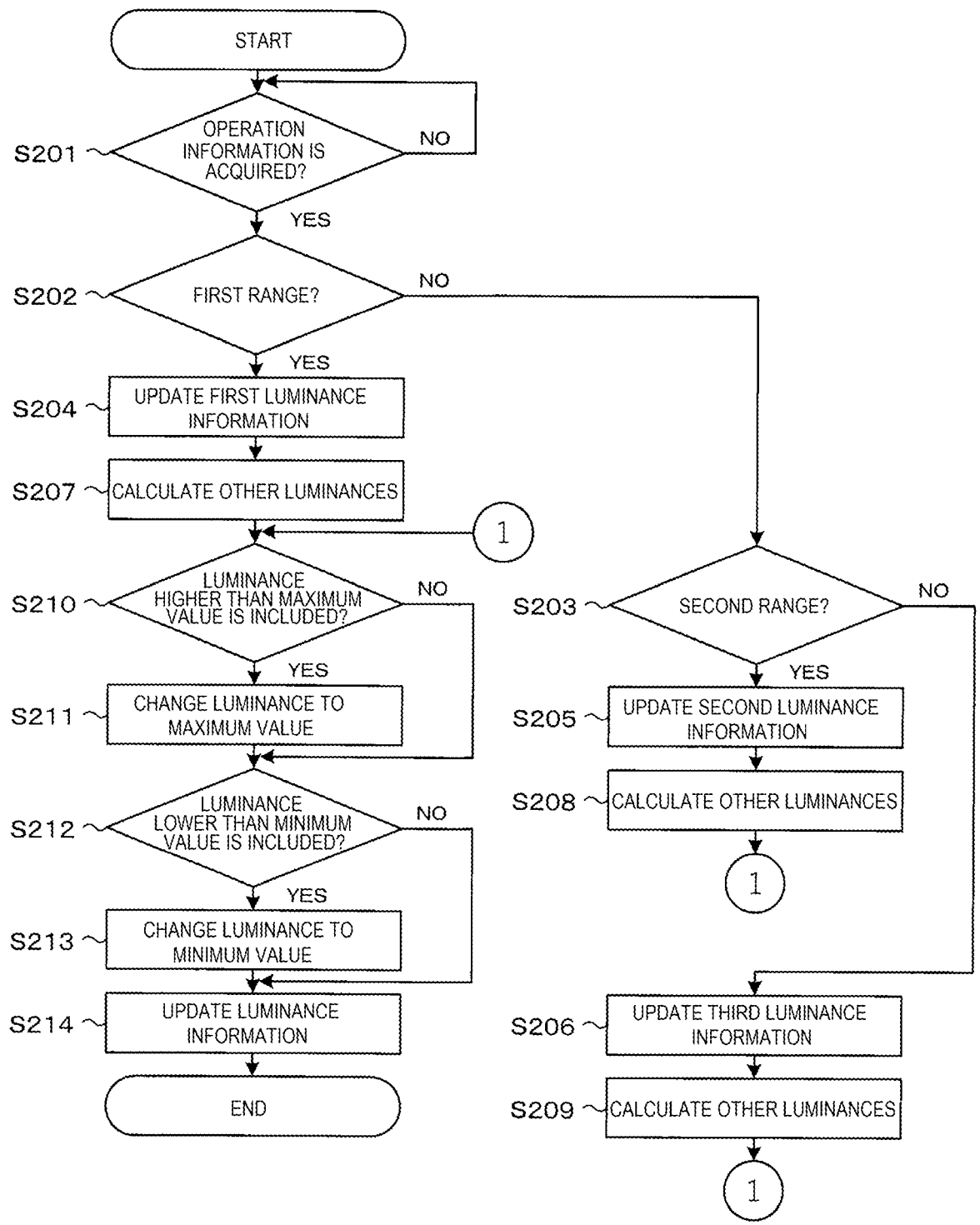
FIG. 7 is a flowchart for explaining an operation of the projector 1 in the case of updating luminance information 104-$n$ designating the luminance of the light source 180 in response to an operation of changing the luminance of the light source 180 accepted from a user.

FIG. 7 is a flowchart for explaining the operation of the projector 1 in the case of updating the luminance information 104-$n$ designating the luminance of the light source 180 in response to an operation of changing the luminance of the light source 180 from the user. A series of operations shown in this flowchart is started, for example, when the power of the projector 1 is turned on and the operation device 16 accepts an input operation for the start of the operation from the user of the projector 1. The projector 1 executes the series of operations shown in this flowchart, for example, at the time T03 shown in FIGS. 4 and 5. In this embodiment, the projector 1 does not execute the series of operations shown in the flowchart of FIG. 6 while executing the series of operations shown in the flowchart of FIG. 7. When, for example, the result of the determination in step S201, described later, is YES while the projector 1 is executing the series of operations shown in the flowchart of FIG. 6, the projector 1 ends the series of operations shown in the flowchart of FIG. 6.

In step S201, the operation information acquirer 124 determines whether the operation device 16 has accepted an operation of changing the luminance of the light source 180 from the user or not. When the operation device 16 has accepted the operation of changing the luminance of the light source 180 from the user, that is, when YES in step S201, the operation information acquirer 124 advances the processing to step S202. When the operation device 16 has not accepted the operation of changing the luminance of the light source 180, that is, when NO in step S201, the operation information acquirer 124 executes the processing in step S201 again.

When the operation device 16 has accepted the operation of changing the luminance of the light source 180 from the user, the operation information acquirer 124 acquires the operation information JO from the operation device 16. Meanwhile, when the operation device 16 has not accepted the operation of changing the luminance of the light source 180 from the user, the operation information acquirer 124 repeats the determination in step S201 until the operation device 16 accepts the operation of changing the luminance of the light source 180 from the user.

In step S202, the determiner 121 determines whether the illuminance in the environment where the projector 1 is installed belongs to the first range or not, referring to a plurality of pieces of the illuminance information 103, and the illuminance threshold information 113. When the illuminance in the environment where the projector 1 is installed belongs to the first range, that is, when YES in step S202, the determiner 121 advances the processing to step S204. Meanwhile, when the illuminance in the environment where the projector 1 is installed does not belong to the first range, that is, when NO in step S202, the determiner 121 advances the processing to step S203.

In step S203, the determiner 121 determines whether the illuminance in the environment where the projector 1 is installed belongs to the second range or not, referring to the plurality of pieces of the illuminance information 103, and the illuminance threshold information 113. When the illuminance in the environment where the projector 1 is installed belongs to the second range, that is, when YES in step S203, the determiner 121 advances the processing to step S205. Meanwhile, when the illuminance in the environment where the projector 1 is installed does not belong to the second range, that is, when NO in step S203, the determiner 121 advances the processing to step S206.

In this embodiment, when the result of the determination is NO in both steps S202 and S203, the illuminance in the environment where the projector 1 is installed belongs to the third range.

In step S204, the luminance manager 122 updates the first luminance information 105-$n$, based on the first operation information JO1. In other words, the luminance manager 122 updates the first luminance information 105-$n$ in response to the first operation from the user.

In step S205, the luminance manager 122 updates the second luminance information 106-$n$, based on the second operation information JO2. In other words, the luminance manager 122 updates the second luminance information 106-$n$ in response to the second operation from the user.

In step S206, the luminance manager 122 updates the third luminance information 107-$n$, based on the third operation information JO3. In other words, the luminance manager 122 updates the third luminance information 107-$n$ in response to the third operation from the user.

When the illuminance in the environment where the projector 1 is installed belongs to the first range, the projector 1 updates the first luminance information 105-$n$ in response to the first operation from the user. When the illuminance in the environment where the projector 1 is installed belongs to the second range, the projector 1 updates the second luminance information 106-$n$ in response to the second operation from the user. When the illuminance in the environment where the projector 1 is installed belongs to the third range, the projector 1 updates the third luminance information 107-$n$ in response to the third operation from the user.

In step S207, the luminance manager 122 calculates the luminance of the light source 180 designated by the second luminance information 106-$n$ after the update and the luminance of the light source 180 designated by the third luminance information 107-$n$ after the update, based on the first luminance information 105-$n$ updated in response to the first operation, and the difference information 115.

In step S208, the luminance manager 122 calculates the luminance of the light source 180 designated by the first luminance information 105-$n$ after the update and the luminance of the light source 180 designated by the third luminance information 107-$n$ after the update, based on the second luminance information 106-$n$ updated in response to the second operation, and the difference information 115.

In step S209, the luminance manager 122 calculates the luminance of the light source 180 designated by the first luminance information 105-$n$ after the update and the luminance of the light source 180 designated by the second luminance information 106-$n$ after the update, based on the third luminance information 107-$n$ updated in response to the third operation, and the difference information 115.

The degree of the difference between the luminance of the light source 180 designated by the luminance information 104-$n$ updated in response to the operation of changing the luminance of the light source 180 from the user and the calculated luminance of the light source 180 designated by the luminance information 104-$n$ after the update, is decided, based on the difference information 115. As described above, in this embodiment, the difference information 115 designates the difference between the luminance of the light source 180 designated by the first luminance information 105-$n$ and the luminance of the light source 180 designated by the second luminance information 106-$n$ to be 20% of the maximum value, as the degree of the difference between the luminance of the light source 180 designated by the first luminance information 105-$n$ and the luminance of the light source 180 designated by the second luminance information 106-$n$. The difference information 115 also designates the difference between the luminance of the light source 180 designated by the second luminance information 106-$n$ and the luminance of the light source 180 designated by the third luminance information 107-$n$ to be 20% of the maximum value, as the degree of the difference between the luminance of the light source 180 designated by the second luminance information 106-*n* and the luminance of the light source 180 designated by the third luminance information 107-*n*. The difference information 115 designates the difference between the luminance of the light source 180 designated by the first luminance information 105-*n* and the luminance of the light source 180 designated by the third luminance information 107-*n* to be 40% of the maximum value, as the degree of the difference between the luminance of the light source 180 designated by the first luminance information 105-*n* and the luminance of the light source 180 designated by the third luminance information 107-*n*.

In step S210, the determiner 121 determines whether the calculated luminances of the light source 180 designated by the luminance information 104-*n* after the update include a luminance higher than the luminance of the light source 180 designated by the maximum value information 108 or not, referring to the maximum value information 108. When the calculated luminances of the light source 180 designated by the luminance information 104-*n* after the update include a luminance higher than the luminance of the light source 180 designated by the maximum value information 108, that is, when YES in step S210, the determiner 121 advances the processing to step S211. Meanwhile, when the calculated luminances of the light source 180 designated by the luminance information 104-*n* after the update do not include a luminance higher than the luminance of the light source 180 designated by the maximum value information 108, that is, when NO in step S210, the determiner 121 advances the processing to step S212.

When the calculated luminances of the light source 180 designated by the luminance information 104-*n* after the update include a luminance higher than the luminance of the light source 180 designated by the maximum value information 108, the luminance manager 122 in step S211 changes the luminance higher than the luminance of the light source 180 designated by the maximum value information 108 to the luminance (maximum value) of the light source 180 designated by the maximum value information 108.

In step S212, the determiner 121 determines whether the calculated luminances of the light source 180 designated by the luminance information 104-*n* after the update include a luminance lower than the luminance of the light source 180 designated by the minimum value information 109 or not, referring to the minimum value information 109. When the calculated luminances of the light source 180 designated by the luminance information 104-*n* after the update include a luminance lower than the luminance of the light source 180 designated by the minimum value information 109, that is, when YES in step S212, the determiner 121 advances the processing to step S213. Meanwhile, when the calculated luminances of the light source 180 designated by the luminance information 104-*n* after the update do not include a luminance lower than the luminance of the light source 180 designated by the minimum value information 109, that is, when NO in step S212, the determiner 121 advances the processing to step S214.

When the calculated luminances of the light source 180 designated by the luminance information 104-*n* after the update include a luminance lower than the luminance of the light source 180 designated by the minimum value information 109, the luminance manager 122 in step S213 changes the luminance lower than the luminance of the light source 180 designated by the minimum value information 109 to the luminance (minimum value) of the light source 180 designated by the minimum value information 109.

In step S214, the luminance manager 122 updates the luminance information 104-*n* except the luminance information 104-*n* updated based on the operation information JO.

When the luminance of the light source 180 designated by the luminance information 104-*n* after the update, calculated in steps S207 to S209, is not a luminance higher than the luminance of the light source 180 designated by the maximum value information 108 or a luminance lower than the luminance of the light source 180 designated by the minimum value information 109, the luminance information 104-*n* is updated in step S214 in such a way that the luminance of the light source 180 designated by the luminance information 104-*n* after the update becomes the calculated luminance of the light source 180. When the luminance of the light source 180 designated by the luminance information 104-*n* after the update, calculated in steps S207 to S209, is a luminance higher than the luminance of the light source 180 designated by the maximum value information 108, the luminance information 104-*n* is updated in step S214 in such a way that the luminance of the light source 180 designated by the luminance information 104-*n* after the update becomes the luminance (maximum value) of the light source 180 designated by the maximum value information 108. When the luminance of the light source 180 designated by the luminance information 104-*n* after the update, calculated in steps S207 to S209, is a luminance lower than the luminance of the light source 180 designated by the minimum value information 109, the luminance information 104-*n* is updated in step S214 in such a way that the luminance of the light source 180 designated by the luminance information 104-*n* after the update becomes the luminance (minimum value) of the light source 180 designated by the minimum value information 109.

After the operation in step S214 is executed, the processing device 12 ends the series of operations shown in the flowchart of FIG. 7.

In this way, the projector 1 executes the series of operations shown in the flowchart of FIG. 7 and thus can collectively update the luminance information 104-*n* designating the luminance of the light source 180, in response to the operation of changing the luminance of the light source 180 from the user.

When changing the luminance of the light source 180 in response to the operation of changing the luminance of the light source 180 from the user, the projector 1 may, for example, execute the series of operations shown in the flowchart of FIG. 6 after executing the series of operations shown in the flowchart of FIG. 7. Also, the projector 1 may, for example, execute the processing in steps S106 and S109 between steps S204 and S207 in the flowchart of FIG. 7, execute the processing in steps S107 and S109 between steps S205 and S208, and execute the processing in steps S108 and S109 between steps S206 and S209.

Thus, according to the first embodiment, the projector 1 can adjust the luminance of the light source 180 according to the illuminance in the environment where the projector 1 is installed. That is, the projector 1 can adjust the luminance of the light source 180 according to the illuminance in the environment and thus can display the projection image GP with a proper luminance, for example, even when used in an environment where the illuminance easily changes.

According to the first embodiment, when the projector 1 has accepted an operation of changing the luminance of the light source 180 from the user, the projector 1 can collectively update the luminance information 104-*n* designating the luminance of the light source 180, in response to the operation. That is, the user can easily set the luminance of the light source 180.

According to the first embodiment, the projector 1 can determine whether the illuminance in the environment where the projector 1 is installed is in the stable state or in the transition state. That is, the projector 1 can accurately acquire the illuminance information 103 corresponding to the illuminance in the environment where the projector 1 is installed.

According to the first embodiment, when the projector 1 has newly accepted an operation of changing the luminance of the light source 180 or the illuminance in the installation environment is changed before the processing of adjusting the luminance of the light source 180 is completed, the projector 1 can adjust the luminance of the light source 180 to the target value after the change without taking the target value before the change. That is, the projector 1 can, for example, reduce the time taken for the adjustment of the luminance of the light source 180 or omit unnecessary adjustment of the luminance and thus can restrain the flickering of the projection image GP.

As described above, the control method for the projector 1 according to the first embodiment is the control method for the projector 1 having the light source 180. The control method includes: determining whether the illuminance in the room R1, where the projector 1 is installed, belongs to the first range or the second range; when the illuminance in the room R1 belongs to the first range, referring to the first luminance information 105-$n$ designating the luminance of the light source 180 corresponding to when the illuminance belongs to the first range, and thus adjusting the luminance of the light source 180; when the illuminance in the room R1 belongs to the second range, referring to the second luminance information 106-$n$ designating the luminance of the light source 180 corresponding to when the illuminance belongs to the second range, and thus adjusting the luminance of the light source 180; when the first operation of changing the luminance of the light source 180 in the state where the illuminance in the room R1 belongs to the first range is accepted from the user, updating the first luminance information 105-$n$ in response to the first operation; updating the second luminance information 106-$n$, based on the first luminance information 105-$n$ updated in response to the first operation; when the second operation of changing the luminance of the light source 180 in the state where the illuminance in the room R1 belongs to the second range is accepted from the user, updating the second luminance information 106-$n$ in response to the second operation; and updating the first luminance information 105-$n$, based on the second luminance information 106-$n$ updated in response to the second operation.

The projector 1 according to the first embodiment includes the light source 180 and the processing device 12. The projector 1 executes: determining whether the illuminance in the room R1, where the projector 1 is installed, belongs to the first range or the second range; when the illuminance in the room R1 belongs to the first range, referring to the first luminance information 105-$n$ designating the luminance of the light source 180 corresponding to when the illuminance belongs to the first range, and thus adjusting the luminance of the light source 180; when the illuminance in the room R1 belongs to the second range, referring to the second luminance information 106-$n$ designating the luminance of the light source 180 corresponding to when the illuminance belongs to the second range, and thus adjusting the luminance of the light source 180; when the first operation of changing the luminance of the light source 180 in the state where the illuminance in the room R1 belongs to the first range is accepted from the user, updating the first luminance information 105-$n$ in response to the first operation; updating the second luminance information 106-$n$, based on the first luminance information 105-$n$ updated in response to the first operation; when the second operation of changing the luminance of the light source 180 in the state where the illuminance in the room R1 belongs to the second range is accepted from the user, updating the second luminance information 106-$n$ in response to the second operation; and updating the first luminance information 105-$n$, based on the second luminance information 106-$n$ updated in response to the second operation.

That is, the projector 1 according to this embodiment can adjust the luminance of the light source 180 in stages according to the illuminance in the environment where the projector 1 is installed. In addition, when the projector 1 has accepted an operation of changing the luminance of the light source 180 from the user, the projector 1 can collectively update the luminance information 104-$n$ designating the luminance of the light source 180, in response to the operation. Thus, even when the illuminance in the environment changes after the user manually changes the luminance of the light source 180, the projector 1 can automatically adjust the luminance of the light source 180. Also, when manually changing the luminance of the light source 180 in the state where the illuminance in the environment belongs to one of the first range and the second range, the user of the projector 1 need not manually set the luminance of the light source 180 corresponding to the other of the first range and the second range. That is, the user of the projector 1 can easily set the luminance of the light source 180.

In the first embodiment, the projector 1 is an example of the "display device". The light source 180 is an example of the "light source". The first luminance information 105-$n$ is an example of the "first luminance information". The second luminance information 106-$n$ is an example of the "second luminance information". The processing device 12 is an example of the "one or a plurality of processing devices".

The first range is an example of the "first range". The second range is an example of the "second range". The first operation is an example of the "first operation". The second operation is an example of the "second operation". The room R1 is an example of the "environment".

When the first luminance information 105-02 is defined as the "first luminance information", the first luminance information 105-03 is an example of the "updated first luminance information".

When the second luminance information 106-04 is defined as the "second luminance information", the second luminance information 106-05 is an example of the "updated second luminance information".

In the control method for the projector 1 according to the first embodiment, the upper limit value of the first range is lower than the lower limit value of the second range. The luminance of the light source 180 has a maximum value. The luminance of the light source 180 designated by the first luminance information 105-$n$ is equal to or lower than the luminance of the light source 180 designated by the second luminance information 106-$n$. In updating the second luminance information 106-$n$ based on the first luminance information 105-$n$ updated in response to the first operation, when the luminance of the light source 180 designated by the second luminance information 106-$n$ is higher than the maximum value, the maximum value is set as the luminance of the light source 180 designated by the second luminance information 106-$n$ updated based on the first luminance information 105-$n$ updated in response to the first operation.

That is, in collectively updating the luminance information 104-$n$ in response to the operation of changing the luminance of the light source 180 from the user, when the luminance of the light source 180 designated by the luminance information 104-$n$ after the update is higher than the maximum value, the projector 1 according to this embodiment can change the luminance higher than the maximum value to the maximum value. Thus, when setting the luminance of the light source 180, the user of the projector 1 can update the luminance information 104-$n$ without having any limitation to the setting due to the maximum value.

In the first embodiment, the luminance of the light source 180 designated by the maximum value information 108 is an example of the "maximum value".

In the control method for the projector 1 according to the first embodiment, the upper limit value of the first range is lower than the lower limit value of the second range. The luminance of the light source 180 has a minimum value. The luminance of the light source 180 designated by the first luminance information 105-$n$ is equal to or lower than the luminance of the light source 180 designated by the second luminance information 106-$n$. In updating the first luminance information 105-$n$ based on the second luminance information 106-$n$ updated in response to the second operation, when the luminance of the light source 180 designated by the first luminance information 105-$n$ is lower than the minimum value, the minimum value is set as the luminance of the light source 180 designated by the first luminance information 105-$n$ updated based on the second luminance information 106-$n$ updated in response to the second operation.

That is, in collectively updating the luminance information 104-$n$ in response to the operation of changing the luminance of the light source 180 from the user, when the luminance of the light source 180 designated by the luminance information 104-$n$ after the update is lower than the minimum value, the projector 1 according to this embodiment can change the luminance lower than the minimum value to the minimum value. Thus, when setting the luminance of the light source 180, the user of the projector 1 can update the luminance information 104-$n$ without having any limitation to the setting due to the minimum value.

In the first embodiment, the luminance of the light source 180 designated by the minimum value information 109 is an example of the "minimum value".

In the control method for the projector 1 according to the first embodiment, as the second luminance information 106-$n$ is updated based on the first luminance information 105-$n$ updated in response to the first operation, the degree of the difference between the luminance of the light source 180 designated by the first luminance information 105-$n$ updated in response to the first operation and the luminance of the light source 180 designated by the second luminance information 106-$n$ updated based on the first luminance information 105-$n$ updated in response to the first operation coincides with the degree of the difference between the luminance of the light source 180 designated by the first luminance information 105-$n$ and the luminance of the light source 180 designated by the second luminance information 106-$n$. Also, as the first luminance information 105-$n$ is updated based on the second luminance information 106-$n$ updated in response to the second operation, the degree of the difference between the luminance of the light source 180 designated by the second luminance information 106-$n$ updated in response to the second operation and the luminance of the light source 180 designated by the first luminance information 105-$n$ updated based on the second luminance information 106-$n$ updated in response to the second operation coincides with the degree of the difference between the luminance of the light source 180 designated by the first luminance information 105-$n$ and the luminance of the light source 180 designated by the second luminance information 106-$n$.

That is, the projector 1 according to this embodiment can make constant the degree of the difference between the luminances of the light source 180 designated by a plurality of pieces of the luminance information 104-$n$ before and after the update. Thus, the user of the projector 1 can set any value as the degree of the difference between the luminances of the light source 180 designated by a plurality of pieces of the luminance information 104-$n$.

The control method for the projector 1 according to the first embodiment also includes acquiring, a plurality of times, the illuminance information 103 corresponding to the illuminance in the room R1, where the projector 1 is installed. When the difference between the maximum illuminance of the illuminances based on the plurality of pieces of the illuminance information 103 and the minimum illuminance of the illuminances based on the plurality of pieces of the illuminance information 103 is equal to or smaller than a predetermined value, whether the illuminance in the room R1, where the projector 1 is installed, belongs to the first range or the second range, is determined, based on the plurality of pieces of the illuminance information 103.

That is, the projector 1 according to this embodiment can determine whether the illuminance in the environment where the projector 1 is installed is in the stable state or in the transition state. That is, the projector 1 can accurately adjust the luminance of the light source 180, using the highly accurate illuminance information 103 acquired when the illuminance in the environment where the projector 1 is installed is in the stable state.

In the first embodiment, the illuminance information 103 is an example of the "illuminance information".

In the first embodiment, the numerical value represented by the state threshold information 112 is an example of the "predetermined value".

2. Modification Examples

Each of the above embodiments can be modified in various manners. Specific aspects of modification are described below. Two or more aspects arbitrarily selected from the aspects described below can be suitably combined together within a range that does not make these aspects contradictory to each other. In the modification examples described below, an element having an effect or function equivalent to an effect or function in the foregoing embodiment is given the symbol used in the foregoing description and the detailed description thereof is omitted where appropriate.

2.1. Modification Example 1

In the foregoing embodiment, the case where determining whether the illuminance in the environment where the projector 1 is installed is in the stable state or not is determining whether the difference between the maximum illuminance of the illuminances based on the plurality of pieces of the illuminance information 103 and the minimum illuminance of the illuminances based on the plurality of pieces of the illuminance information 103 is equal to or smaller than the predetermined value or not, is described as an example. However, the present disclosure is not limited to such an aspect. For example, in a projector 1A according to this modification example, it is assumed that determining whether the illuminance in the environment where the projector 1A is installed is in the stable state or not is determining whether the difference between the illuminances based on the illuminance information 103 acquired arbitrarily twice consecutively, of the plurality of pieces of the illuminance information 103, is equal to or smaller than a predetermined value or not. In this modification example, the state threshold information 112 is information representing a numerical value that serves as a threshold for determining whether the difference between the illuminances based on the illuminance information 103 acquired arbitrarily twice consecutively, of the plurality of pieces of the illuminance information 103, is equal to or smaller than the predetermined value or not.

Thus, according to Modification Example 1, the projector 1A can determine whether the illuminance in the environment where the projector 1A is installed is in the stable state or in the transition state. That is, the projector 1A can accurately acquire the illuminance information 103 corresponding to the illuminance in the environment where the projector 1A is installed.

As described above, the control method for the projector 1A according to Modification Example 1 also includes acquiring, a plurality of times, the illuminance information 103 corresponding to the illuminance in the room R1, where the projector 1A is installed. When the difference between the illuminances based on the illuminance information 103 acquired arbitrarily twice consecutively, of the plurality of pieces of the illuminance information 103, is equal to or smaller than the predetermined value, whether the illuminance in the room R1, where the projector 1A is installed, belongs to the first range or the second range, is determined, based on the plurality of pieces of the illuminance information 103.

That is, the projector 1A according to this modification example can determine whether the illuminance in the environment where the projector 1A is installed is in the stable state or in the transition state. That is, the projector 1A can accurately adjust the luminance of the light source 180, using the highly accurate illuminance information 103 acquired when the illuminance in the environment where the projector 1A is installed is in the stable state.

In Modification Example 1, the projector 1A is an example of the "display device". The illuminance information 103 is an example of the "illuminance information".

The first range is an example of the "first range". The second range is an example of the "second range". The room R1 is an example of the "environment".

In Modification Example 1, the numerical value represented by the state threshold information 112 is an example of the "predetermined value".

2.2. Modification Example 2

In the foregoing embodiment and modification example, the case where the average value of the illuminances based on the plurality of pieces of the illuminance information 103 is used as the illuminance in the environment where the projector is installed, when determining whether the illuminance in the environment where the projector is installed belongs to the first range, the second range, or the third range, is described as an example. However, the present disclosure is not limited such an aspect. For example, the maximum value of the illuminances based on the plurality of pieces of the illuminance information 103, the minimum value of the illuminances based on the plurality of pieces of the illuminance information 103, or the median of the illuminances based on the plurality of pieces of the illuminance information 103 may be employed.

2.3. Modification Example 3

In the foregoing embodiment and modification example, the case where the amount of change per unit time in the luminance of the light source 180 is constant or substantially constant, when the luminance of the light source 180 is adjusted, is described as an example. However, the present disclosure is not limited to such an aspect. For example, the luminance of the light source 180 may be adjusted in such a way that the time taken from the start of the luminance adjustment to the end of the luminance adjustment is constant or substantially constant. Specifically, the luminance of the light source 180 may be adjusted in such a way that the time taken from the start of the luminance adjustment to the end of the luminance adjustment is 40 seconds, which is equivalent to the time taken for the light adaptation of the human eye. Thus, luminance adjustment that does not make the user feel uncomfortable is executed.

2.4. Modification Example 4

In the foregoing embodiment and modification example, the case where the illuminance in the environment where the projector is installed is classified into one of three types of ranges is described as an example. However, the present disclosure is not limited to such an aspect. For example, the illuminance in the environment where the projector is installed may be classified into one of two types of ranges or may be classified into one of four or more types of ranges.

2.5. Modification Example 5

In the foregoing embodiment and modification example, the case where, as the degree of the difference between the luminance information 104-$n$ updated in response to the operation of changing the luminance of the light source 180 from the user and the luminance information 104-$n$ calculated based on the updated luminance information 104-$n$, the difference information 115 designates the difference between the updated luminance information 104-$n$ and the luminance information 104-$n$ calculated based on the updated luminance information 104-$n$ to be a predetermined value, is described as an example. However, the present disclosure is not limited to such an aspect. For example, as the degree of the difference between the luminance information 104-$n$ updated in response to the operation of changing the luminance of the light source 180 from the user and the luminance information 104-$n$ calculated based on the updated luminance information 104-$n$, the difference information 115 may designate the ratio between the updated luminance information 104-$n$ and the luminance information 104-$n$ calculated based on the updated luminance information 104-$n$ to be a predetermined value. Specifically, as the degree of the difference between the luminance of the light source 180 designated by the first luminance information 105-$n$ and the luminance of the light source 180 designated by the second luminance information 106-$n$, the difference information 115 may designate the ratio between the luminance of the light source 180 designated by the first luminance information 105-*n* and the luminance of the light source 180 designated by the second luminance information 106-*n* to be 2:3.

What is claimed is:

1. A control method for a display device, the control method comprising:
    determining whether an illuminance in an environment where a display device having a light source is installed belongs to a first range or a second range, an upper limit value of the first range being lower than a lower limit value of the second range;
    when the illuminance in the environment belongs to the first range, adjusting a luminance of the light source by referring to first luminance information designating the luminance corresponding to when the illuminance in the environment belongs to the first range;
    when the illuminance in the environment belongs to the second range, adjusting the luminance of the light source by referring to second luminance information designating the luminance corresponding to when the illuminance in the environment belongs to the second range, the luminance designated by the first luminance information is equal to or lower than the luminance designated by the second luminance information;
    when a first operation of changing the luminance when the illuminance belongs to the first range is accepted from a user, updating the first luminance information to an updated first luminance information in response to the first operation;
    updating the second luminance information, based on the updated first luminance information;
    when a second operation of changing the luminance when the illuminance belongs to the second range is accepted from the user, updating the second luminance information to an updated second luminance information in response to the second operation; and
    updating the first luminance information, based on the updated second luminance information, wherein
    in updating the second luminance information based on the updated first luminance information, when the luminance designated by the second luminance information, calculated based on the updated first luminance information, is higher than a maximum value of the luminance that can be set, the maximum value is set as the luminance designated by the second luminance information updated based on the updated first luminance information.

2. The control method for the display device according to claim 1, wherein
    in updating the first luminance information based on the updated second luminance information, when the luminance designated by the first luminance information, calculated based on the updated second luminance information, is lower than a minimum value of the luminance that can be set, the minimum value is set as the luminance designated by the first luminance information updated based on the second luminance information updated in response to the second operation.

3. The control method for the display device according to claim 1, wherein
    a degree of a difference between the luminance designated by the updated first luminance information and the luminance designated by the second luminance information updated based on the updated first luminance information coincides with the degree of the difference between the luminance designated by the first luminance information and the luminance designated by the second luminance information, and
    a degree of a difference between the luminance designated by the updated second luminance information and the luminance designated by the first luminance information updated based on the updated second luminance information coincides with the degree of the difference between the luminance designated by the first luminance information and the luminance designated by the second luminance information.

4. The control method for the display device according to claim 1, further comprising:
    acquiring illuminance information corresponding to the illuminance in the environment, a plurality of times, wherein
    the determining includes determining whether the illuminance in the environment belongs to the first range or the second range, based on the plurality of pieces of the illuminance information, when a difference between a maximum illuminance of illuminances based on the plurality of pieces of the illuminance information and a minimum illuminance of the illuminances based on the plurality of pieces of the illuminance information is equal to or smaller than a predetermined value.

5. The control method for the display device according to claim 1, further comprising:
    acquiring illuminance information corresponding to the illuminance in the environment, a plurality of times, wherein
    the determining includes whether the illuminance in the environment belongs to the first range or the second range, based on the plurality of pieces of the illuminance information, when a difference between illuminances based on the illuminance information acquired arbitrarily twice consecutively, of the plurality of pieces of the illuminance information, is equal to or smaller than a predetermined value.

6. A display device comprising:
    a light source; and
    one or a plurality of processing devices executing:
        determining whether an illuminance in an environment where the display device is installed belongs to a first range or a second range, an upper limit value of the first range being lower than a lower limit value of the second range;
        when the illuminance in the environment belongs to the first range, adjusting a luminance of the light source by referring to first luminance information designating the luminance corresponding to when the illuminance in the environment belongs to the first range;
        when the illuminance in the environment belongs to the second range, adjusting the luminance of the light source by referring to second luminance information designating the luminance corresponding to when the illuminance in the environment belongs to the second range, the luminance designated by the first luminance information is equal to or lower than the luminance designated by the second luminance information;
        when a first operation of changing the luminance when the illuminance belongs to the first range is accepted from a user, updating the first luminance information to an updated first luminance information in response to the first operation;
        updating the second luminance information, based on the updated first luminance information;

when a second operation of changing the luminance when the illuminance belongs to the second range is accepted from the user, updating the second luminance information to an updated second luminance information in response to the second operation; and updating the first luminance information, based on the updated second luminance information, wherein, in updating the second luminance information based on the updated first luminance information, when the luminance designated by the second luminance information, calculated based on the updated first luminance information, is higher than a maximum value of the luminance that can be set, the maximum value is set as the luminance designated by the second luminance information updated based on the updated first luminance information.

7. A control method for a display device, the control method comprising:

determining whether an illuminance in an environment where a display device having a light source is installed belongs to a first range or a second range, an upper limit value of the first range being lower than a lower limit value of the second range;

when the illuminance in the environment belongs to the first range, adjusting a luminance of the light source by referring to first luminance information designating the luminance corresponding to when the illuminance in the environment belongs to the first range;

when the illuminance in the environment belongs to the second range, adjusting the luminance of the light source by referring to second luminance information designating the luminance corresponding to when the illuminance in the environment belongs to the second range, the luminance designated by the first luminance information is equal to or lower than the luminance designated by the second luminance information;

when a first operation of changing the luminance when the illuminance belongs to the first range is accepted from a user, updating the first luminance information to an updated first luminance information in response to the first operation;

updating the second luminance information, based on the updated first luminance information;

when a second operation of changing the luminance when the illuminance belongs to the second range is accepted from the user, updating the second luminance information to an updated second luminance information in response to the second operation; and updating the first luminance information, based on the updated second luminance information, wherein:

in updating the first luminance information based on the updated second luminance information, when the luminance designated by the first luminance information, calculated based on the updated second luminance information, is lower than a minimum value of the luminance that can be set, the minimum value is set as the luminance designated by the first luminance information updated based on the second luminance information updated in response to the second operation.

* * * * *